United States Patent
Yoo et al.

(10) Patent No.: US 10,333,668 B2
(45) Date of Patent: Jun. 25, 2019

(54) ENHANCED COMPONENT CARRIER DISCOVERY REFERENCE SIGNALS

(71) Applicant: QUALCOMM Incorporated, San Diego, CA (US)

(72) Inventors: Taesang Yoo, Riverside, CA (US); Jing Sun, San Diego, CA (US); Siddhartha Mallik, San Diego, CA (US); Tao Luo, San Diego, CA (US); Peter Gaal, San Diego, CA (US); Xiaoxia Zhang, San Diego, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/250,586

(22) Filed: Aug. 29, 2016

(65) Prior Publication Data

US 2017/0099126 A1  Apr. 6, 2017

Related U.S. Application Data

(60) Provisional application No. 62/237,176, filed on Oct. 5, 2015.

(51) Int. Cl.
*H04W 4/00* (2018.01)
*H04L 5/00* (2006.01)
(Continued)

(52) U.S. Cl.
CPC ........ *H04L 5/0048* (2013.01); *H04J 11/0069* (2013.01); *H04L 5/001* (2013.01);
(Continued)

(58) Field of Classification Search
CPC ....... H04L 5/0048; H04L 5/001; H04L 5/007; H04L 5/0037; H04L 5/0064; H04L 7/00; H04J 11/0069
See application file for complete search history.

(56) References Cited

U.S. PATENT DOCUMENTS

| 8,422,577 B1 * | 4/2013 | Shetty | H04L 1/0006 370/203 |
|---|---|---|---|
| 8,953,720 B1 * | 2/2015 | Palanivelu | H04L 27/0012 375/340 |

(Continued)

OTHER PUBLICATIONS

CATT, "LAA Transmission Modes and CSI Reporting," 3GPP TSG RAN WG1 Meeting #82bis, R1-155199, Malmo, Sweden, Oct. 5-9, 2015, 3 pgs., XP051002168, 3rd Generation Partnership Project.
(Continued)

*Primary Examiner* — Stephen M D Agosta
(74) *Attorney, Agent, or Firm* — Holland & Hart LLP

(57) ABSTRACT

Methods, systems, and devices are described for a system that supports wireless communication with a first set of devices using a first OFDM symbol duration associated with a first tone spacing (i.e., a first physical layer (PHY) configuration) and second set of devices using a PHY configuration associated with a second tone spacing. A base station may transmit a set of discovery reference signals (DRS) in a narrowband region of a primary channel of a carrier. The DRS may have the first PHY configuration and a secondary channel of the carrier may support communications using the second PHY configuration. The base station may transmit a first system information (SI) message for one set of devices using the first PHY configuration, and it may transmit a second SI message for another set of devices using the second PHY configuration.

27 Claims, 15 Drawing Sheets

(51) Int. Cl.
*H04J 11/00* (2006.01)
*H04L 7/00* (2006.01)
(52) U.S. Cl.
CPC ............ *H04L 5/005* (2013.01); *H04L 5/0007* (2013.01); *H04L 5/0037* (2013.01); *H04L 5/0064* (2013.01); *H04L 7/00* (2013.01)

(56) References Cited

U.S. PATENT DOCUMENTS

| | | | | |
|---|---|---|---|---|
| 8,995,987 | B1* | 3/2015 | Singh | H04W 28/0221 455/423 |
| 2003/0072255 | A1* | 4/2003 | Ma | H04B 7/022 370/208 |
| 2006/0083211 | A1* | 4/2006 | Laroia | H04L 5/0042 370/343 |
| 2007/0155387 | A1* | 7/2007 | Li | H04L 1/0007 455/441 |
| 2007/0268812 | A1* | 11/2007 | Yoon | H04L 1/0006 370/203 |
| 2010/0149961 | A1* | 6/2010 | Lee | H04L 5/0007 370/204 |
| 2011/0164698 | A1* | 7/2011 | Wu | H04L 5/0037 375/261 |
| 2013/0089067 | A1* | 4/2013 | Ji | H04W 56/00 370/330 |
| 2013/0157709 | A1* | 6/2013 | Ji | H04W 52/04 455/522 |
| 2014/0286182 | A1* | 9/2014 | Chen | H04L 5/0023 370/252 |
| 2014/0301301 | A1* | 10/2014 | Cheng | H04L 5/0048 370/329 |
| 2015/0092582 | A1* | 4/2015 | Liao | H04J 11/005 370/252 |
| 2015/0280871 | A1 | 10/2015 | Xu et al. | |

OTHER PUBLICATIONS

CMCC, "Discussion on Small Cell Architectures and Procedures for Small Cell On/Off," 3GPP TSG RAN WG1 Meeting #76bis, R1-141613, Shenzhen, China, Mar. 31-Apr. 4, 2014, 5 pgs., XP050787280, 3rd Generation Partnership Project.

ISA/EP, International Search Report and Written Opinion of the International Searching Authority, Int'l Application No. PCT/US2016/049420, dated Mar. 6, 2017, European Patent Office, Rijswijk, NL, 24 pgs.

LG Electronics, "DRS Design in LAA," 3GPP TSG RAN WG1 Meeting #82, R1-154264, Beijing, China, Aug. 24-28, 2015, 8 pgs., XP051001595, 3rd Generation Partnership Project.

Mediatek Inc., "Consideration on Synchronization Channel Design for NB IoT," 3GPP TSG RAN WG1 Meeting #82bis, R1-155894, Malmo, Sweden, Oct. 5-9, 2015, 4 pgs., XP051039772, 3rd Generation Partnership Project.

ISA/EPO, Partial International Search Report of the International Searching Authority, Int'l. App. No. PCT/US2016/049420, Nov. 22, 2016, European Patent Office, Rijswijk, NL, 9 pgs.

* cited by examiner

US 10,333,668 B2

ENHANCED COMPONENT CARRIER DISCOVERY REFERENCE SIGNALS

CROSS REFERENCES

The present application for patent claims priority to U.S. Provisional Patent Application No. 62/237,176 by Yoo et al., entitled "Enhanced Component Carrier Discovery Reference Signals," filed Oct. 5, 2015, assigned to the assignee hereof, and is hereby expressly incorporated by reference herein in its entirety.

BACKGROUND

The following relates generally to wireless communication, and more specifically to enhanced component carrier discovery reference signals (DRS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a wireless system may support communication using multiple physical (PHY) layer configurations. For example, the different PHY layer configurations may use different symbol durations and different tone spacing. The different PHY layer configurations may be used to communicate with different sets of devices. A wireless system supporting different device types with different PHY layer configurations may use one or more DRS to enable the devices to identify, synchronize, and access the network. However, if the DRS are not compatible with the different devices, some devices may experience problems accessing the system.

SUMMARY

A base station may transmit a set of discovery reference signals (DRS) in a narrowband region of a primary channel of a carrier. The DRS may have a first physical layer (PHY) configuration based on a first orthogonal frequency division multiplexing (OFDM) symbol duration and tone spacing. A secondary channel of the carrier may support communications using a second PHY configuration based on a second OFDM symbol duration and tone spacing. In some cases the base station may transmit a first system information (SI) message using the first PHY configuration and then transmit a second SI message using the second PHY configuration to support different sets of devices. The different system information may be transmitted at different times or on different channels (e.g., the system information with the second PHY configuration may be sent on a secondary channel).

A method of wireless communication in a system that supports communication with a first set of devices using a first orthogonal frequency division multiplexing (OFDM) symbol duration associated with a first tone spacing and second set of devices using a second OFDM symbol duration associated with a second tone spacing is described. The method may include identifying one or more DRS in a narrowband region of a carrier, wherein the one or more DRS use the first OFDM symbol duration and the first tone spacing, identifying a second region of the carrier, wherein the second region supports the second OFDM symbol duration and the second tone spacing, and communicating in the second region of the carrier using the second OFDM symbol duration and the second tone spacing.

An apparatus for wireless communication in a system that supports communication with a first set of devices using a first orthogonal frequency division multiplexing (OFDM) symbol duration associated with a first tone spacing and second set of devices using a second OFDM symbol duration associated with a second tone spacing is described. The apparatus may include means for identifying one or more DRS in a narrowband region of a carrier, wherein the one or more DRS use the first OFDM symbol duration and the first tone spacing, means for identifying a second region of the carrier, wherein the second region supports the second OFDM symbol duration and the second tone spacing, and means for communicating in the second region of the carrier using the second OFDM symbol duration and the second tone spacing.

A further apparatus for wireless communication in a system that supports communication with a first set of devices using a first orthogonal frequency division multiplexing (OFDM) symbol duration associated with a first tone spacing and second set of devices using a second OFDM symbol duration associated with a second tone spacing is described. The apparatus may include a processor, memory in electronic communication with the processor, and instructions stored in the memory and operable, when executed by the processor, to cause the apparatus to identify one or more DRS in a narrowband region of a carrier, wherein the one or more DRS use the first OFDM symbol duration and the first tone spacing, identify a second region of the carrier, wherein the second region supports the second OFDM symbol duration and the second tone spacing, and communicate in the second region of the carrier using the second OFDM symbol duration and the second tone spacing.

A non-transitory computer-readable medium storing code for wireless communication in a system that supports communication with a first set of devices using a first orthogonal frequency division multiplexing (OFDM) symbol duration associated with a first tone spacing and second set of devices using a second OFDM symbol duration associated with a second tone spacing is described. The code may include instructions executable to identify one or more DRS in a narrowband region of a carrier, wherein the one or more DRS use the first OFDM symbol duration and the first tone spacing, identify a second region of the carrier, wherein the second region supports the second OFDM symbol duration and the second tone spacing, and communicate in the second region of the carrier using the second OFDM symbol duration and the second tone spacing.

In some examples of the method, apparatuses, or non-transitory computer-readable medium described herein, the one or more DRS in the narrowband region of the carrier are identified using a first receiver that operates according to the first OFDM symbol duration and the first tone spacing, and wherein the communication in the second region of the carrier uses a second receiver that operates according to the second OFDM symbol duration and the second tone spacing. Additionally or alternatively, some examples may include processes, features, means, or instructions for performing a cell search or measurement procedure using the first receiver, wherein the one or more DRS are identified based at least in part on the cell search or measurement procedure.

Some examples of the method, apparatuses, or non-transitory computer-readable medium described herein may further include processes, features, means, or instructions for transmitting the one or more DRS and a first system information message during a first time period using the first OFDM symbol duration and the first tone spacing, and transmitting a second system information (SI) message during a second time period using the second OFDM symbol duration and the second tone spacing. Additionally or alternatively, in some examples the second SI message comprises a difference relative to the first SI message.

In some examples of the method, apparatuses, or non-transitory computer-readable medium described herein, the one or more DRS, the first SI message, and the second SI message are transmitted on a first channel that supports communication with the first set of devices and the second set of devices, the method further comprising transmitting one or more additional DRS in a second channel using the first OFDM symbol duration and the first tone spacing, wherein the second channel supports communication with the second set of devices. Additionally or alternatively, some examples may include processes, features, means, or instructions for transmitting the one or more DRS and a first SI message in a first channel of the carrier during a first time period, wherein the first channel supports communication with the first set of devices and the second set of devices, and transmitting one or more additional DRS and a second SI message in the first channel and a second channel of the carrier during a second time period, wherein second channel supports communication with the second set of devices.

Some examples of the method, apparatuses, or non-transitory computer-readable medium described herein may further include processes, features, means, or instructions for receiving a measurement report from a UE, and determining a number of system bandwidth channels for a neighbor base station, that the neighbor base station supports communication using the second OFDM symbol duration and the second tone spacing or that the second OFDM symbol duration and the second tone spacing are unsupported by the neighbor base station based at least in part on the measurement report. Additionally or alternatively, some examples may include processes, features, means, or instructions for receiving a measurement report from a UE, and determining a number of channels of a system bandwidth used by a neighbor base station based at least in part on the measurement report.

In some examples of the method, apparatuses, or non-transitory computer-readable medium described herein, the measurement report comprises information for each channel that comprises a DRS used by the neighbor base station. Additionally or alternatively, some examples may include processes, features, means, or instructions for determining that a plurality of CCA attempts on a primary channel was unsuccessful during a transmission window, and refraining from transmitting the one or more DRS during the transmission window.

Some examples of the method, apparatuses, or non-transitory computer-readable medium described herein may further include processes, features, means, or instructions for determining that a first CCA attempt on a primary channel of the carrier was unsuccessful, determining that a second CCA attempt on a non-primary channel of the carrier was successful, and transmitting the one or more DRS on the non-primary channel based at least in part on the determination that the first CCA attempt was unsuccessful and the determination that the second CCA attempt was successful, wherein the non-primary channel comprises the narrowband region of the carrier. Additionally or alternatively, in some examples the one or more DRS comprise an indication of whether communication using the first OFDM symbol duration and the first tone spacing is supported by a channel comprising the narrowband region.

Some examples of the method, apparatuses, or non-transitory computer-readable medium described herein may further include processes, features, means, or instructions for determining whether a channel supports communication using the first OFDM symbol duration and the first tone spacing based at least in part on the one or more DRS, an SI message, a phase shift between different pilots within the one or more DRS, a relative location of a secondary synchronization signal (SSS) with respect to a primary synchronization signal (PSS) within DRS, or a successful decoding attempt of the SI message. Additionally or alternatively, some examples may include processes, features, means, or instructions for identifying a first transmission power level for the one or more DRS, wherein the first transmission power level is independent of a bandwidth occupied by a transmission containing the one or more DRS, identifying a bandwidth of the carrier, and adjusting a second transmission power level for a region outside the bandwidth occupied by a transmission containing the one or more DRS based at least in part on the first transmission power level for the one or more DRS, a total transmission power for the carrier, or the bandwidth occupied by a transmission containing the one or more DRS, or a combination thereof.

In some examples of the method, apparatuses, or non-transitory computer-readable medium described herein, the one or more DRS comprises a PSS, a SSS, a master information block (MIB), a cell-specific reference signals (CRS), a channel state information reference signal (CSI-RS), or any combination thereof. Additionally or alternatively, in some examples the one or more DRS are directed to the first set of devices and the second set of devices.

In some examples of the method, apparatuses, or non-transitory computer-readable medium described herein, the narrowband region of the carrier comprises six or eight center resource blocks of a channel of the carrier. Additionally or alternatively, in some examples the first OFDM symbol duration is greater than the second OFDM symbol duration and the first tone spacing is less than the second tone spacing.

In some examples of the method, apparatuses, or non-transitory computer-readable medium described herein, the narrowband region is bounded by a first guard band and a second guard band when the narrowband region is frequency-division multiplexed with the second region of the carrier.

DETAILED DESCRIPTION

Figure 1:
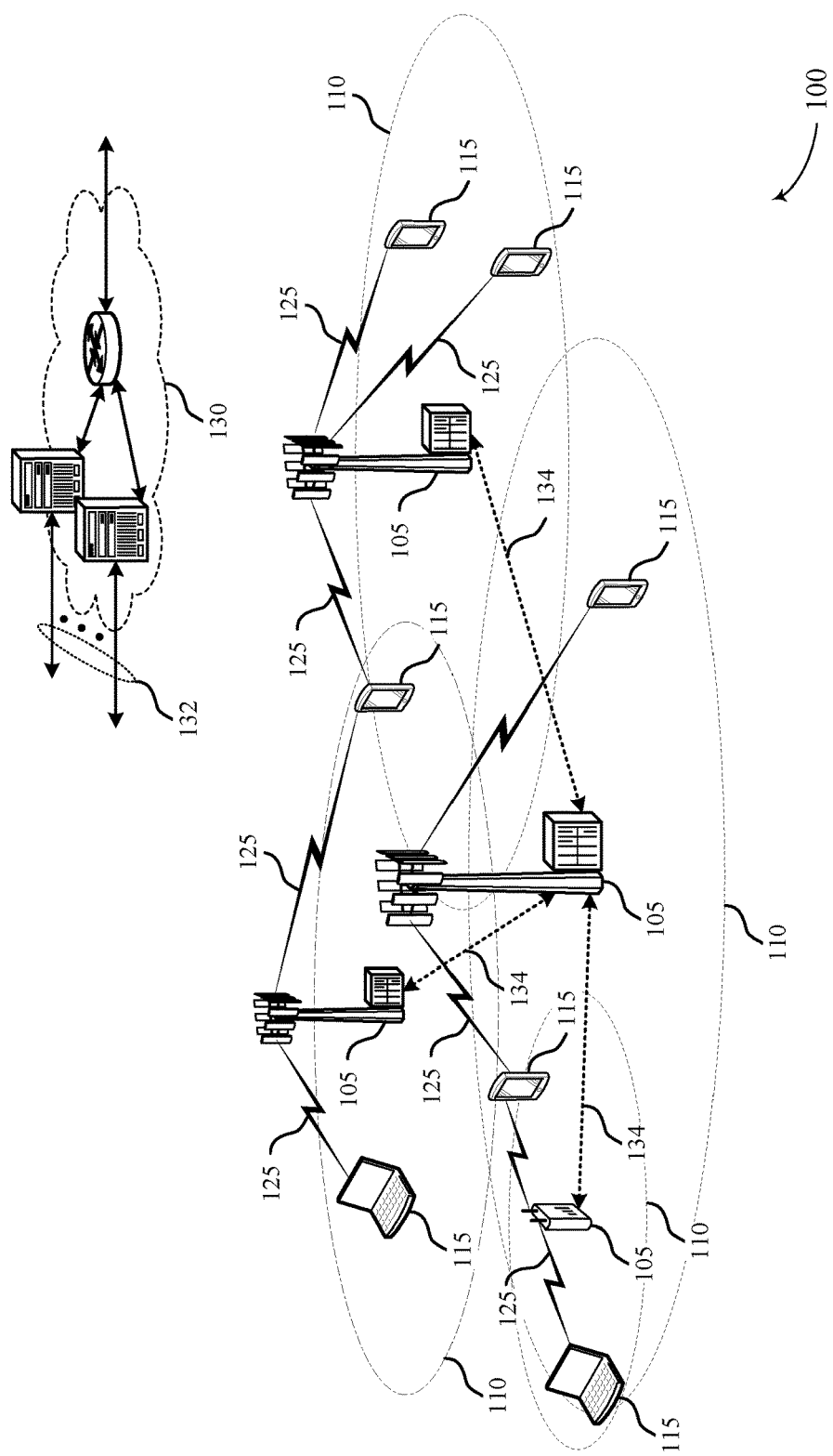
FIG. 1 illustrates an example of a wireless communications system that supports enhanced component carrier (eCC) discovery reference signals (DRS) in accordance with aspects of the present disclosure.

Some wireless communication systems may use enhanced component carriers (eCCs) to improve throughput, latency, or reliability of wireless communications. In a system supporting eCC operation, a user equipment (UE) may rely on discovery reference signals (DRS) to discover cells deployed in a network. Various DRS configurations are described that support multi-channel coexistence between eCC and non-eCC communications, and which support different physical (PHY) layer configurations for operation with different devices.

For example, in some cases an eCC may be introduced in conjunction with a non-eCC system, and both eCC and non-eCC may be served on the same channels (e.g., channels in unlicensed bands on 5 GHz). Examples of non-eCC systems may include Long Term Evolution (LTE), LTE-Advanced (LTE-A), licensed assisted access (LAA), or LTE in unlicensed spectrum. Examples of eCC systems may include 5G new radio (NR) systems. A mixed network may include non-eCC base stations and mobile devices. An eCC base station may also support non-eCC communications to serve non-eCC devices.

An eCC may be characterized by a short symbol duration, wide tone spacing, short subframe duration, operation in contention-based spectrum, or wide bandwidth. DRS may be used for initial acquisition, neighbor cell acquisition, and measurements of serving and neighboring cells. DRS may include synchronization and/or reference signals, system information signals, and reference signals.

In some cases, an eCC-capable base station may support both non-eCC and eCC communications. So an eCC base station may transmit both non-eCC DRS and eCC DRS to accommodate various types of UEs. An eCC carrier may have a relatively wide system bandwidth (e.g., 80 MHz) as compared to a non-eCC carrier, which may have a relatively smaller bandwidth (e.g., 20 MHz). Additionally, an eCC carrier may include one or more channels (e.g., segments of bandwidth, e.g., 20 MHz). Non-eCC UEs may be served within an eCC carrier. In some cases, non-eCC UEs may be served on a subset of channels within an eCC carrier. We term the channels where the non-eCC UEs may be served as primary channels and the channels where the non-eCC UEs are not served as secondary channels. eCC UEs are served on both primary and secondary channels, as a wideband eCC carrier spans both primary and secondary channels. As a result, non-eCC DRS may be transmitted on primary channels. There may also be one or more primary channels.

Several different options may exist for the transmission of DRS accommodating both eCC and non-eCC communication, including transmitting a shared DRS over the primary channel only, transmitting a separate DRS over all channels, and transmitting a shared DRS over all channels.

In some cases, a UE or network may distinguish between non-eCC-capable and eCC-capable base stations. Information regarding the availability of eCC service may, for instance, be carried in a master information block (MIB) or enhanced MIB (eMIB), in a system information block (SIB), such as SIB1 or an enhanced SIB1 (eSIB1), or may be conveyed through other manners within DRS. Furthermore, a base station may obtain a measurement of neighboring cells by requesting that a UE to perform a measurement of DRS of a neighboring cell. In some cases, the measurement may not tell the UE the neighbor cells type (e.g., eCC or non-eCC) or the bandwidth associated with that cell. The base station may, however, interpret the measurement information obtained by the UE and determine the cell type implicitly.

In some examples, power scaling of transmissions may be employed to maintain a constant power spectral density (PSD) for DRS transmissions (e.g., for proper measurement and to avoid interruption in ongoing data transmissions). By way of example, a base station may use a fixed PSD on the center six resource blocks (RBs) regardless of bandwidth of transmission.

Aspects of the disclosure introduced above are further described below in the context of a wireless communication system. Multiple different examples of DRS configurations are also described. Aspects of the disclosure are further illustrated by and described with reference to apparatus diagrams, system diagrams, and flowcharts that relate to eCC DRS.

FIG. 1 illustrates an example of a wireless communications system 100 that supports eCC DRS in accordance with various aspects of the present disclosure. The wireless communications system 100 includes base stations 105, UEs 115, and a core network 130. In some examples, the wireless communications system 100 may be a LTE/LTE-A network. Wireless system 100 may support multi-channel coexistence between eCC and non-eCC communications using a combined DRS configuration.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device or the like. Some UEs 115 may support communication using eCCs, while eCC communication may be unsupported by some UEs 115. The system 100 may thus support communication with multiple sets of devices capable of operating according to different PHY layer configurations.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform a clear channel assessment (CCA) or enhanced CCA (eCCA) prior to communicating to determine whether the channel is available. A CCA may include an energy detection procedure to determine whether there are any other active transmissions. For example, the device may infer that a change in a received signal strength indicator (RSSI) of a power meter indicates that a channel is occupied. Specifically, signal power that is concentrated in a certain bandwidth and exceeds a predetermined noise floor may indicate the presence of another wireless transmitter. A CCA may also include detection of specific sequences that indicate use of the channel. For example, another device may transmit a specific preamble prior to transmitting a data sequence.

In some cases, wireless communications system 100 may utilize one or more eCCs. As mentioned above, an eCC may be characterized by one or more features including: short symbol duration, wide tone spacing, short subframe duration, and wide bandwidth. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). Various portions of the bandwidth utilized by system 100 may support eCC operation.

An eCC characterized by wide bandwidth may include one or more channel segments. For example an eCC carrier bandwidth may be 80 MHz and may include four 20 MHz channel segments. CCA/eCCA may be performed on each 20 MHz channel separately, and the transmission by eCC devices (e.g., base stations and UEs) may be subject to CCA/eCCA success. Thus, the actual transmission bandwidth for a given transmission instance may be less than the eCC carrier bandwidth if CCA/eCCA fails on some of the channel segments. Some of the base stations 105 may support communication using eCCs while eCC may be unsupported by some base stations 105 with the system.

An eCC may use a short symbol duration or TTI length. A shorter symbol duration may be associated with increased subcarrier spacing. An eCC may utilize dynamic time division duplex (TDD) operation (i.e., it may switch from DL to UL operation for short bursts according to dynamic conditions). Examples of communication using eCCs may include 5G NR deployed in licensed spectrum, unlicensed spectrum, or shared spectrum, or using radio frequency (RF) spectrum bands below 6 GHz or using millimeter wave (mmW) RF spectrum bands.

A UE 115 attempting to access a wireless network may perform an initial cell search by detecting a primary synchronization signal (PSS) from a base station 105. The PSS may enable synchronization of slot timing and may indicate a PHY layer identity value. The UE 115 may then receive a secondary synchronization signal (SSS). The SSS may enable radio frame synchronization, and may provide a cell identity (CID) value, which may be combined with the PHY layer identity value to identify the cell. The SSS may also enable detection of a duplexing mode and a cyclic prefix (CP) length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a MIB, which may be transmitted in the physical broadcast channel (PBCH). The MIB may contain system bandwidth information, a system frame number (SFN), and a physical hybrid automatic repeat request indicator channel (PHICH) configuration.

After decoding the MIB, the UE 115 may receive one or more Ms. For example, SIB1 may contain cell access parameters and scheduling information for other Ms. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. After completing initial cell synchronization, a UE 115 may decode the MIB, SIB1, and SIB2 prior to accessing the network. The MIB may be transmitted on PBCH and may utilize the first 4 OFDMA symbols of the second slot of the first subframe of each radio frame. It may use the middle 6 RBs (i.e., 72 subcarriers) in the frequency domain.

The MIB carries information for UE initial access, including, for instance, DL channel bandwidth in term of RBs, PHICH configuration (e.g., duration and resource assignment), and SFN. A new MIB may be broadcast every fourth radio frame (i.e., SFN mod 4=0) and rebroadcast every frame (e.g., every 10 ms). Each repetition is scrambled with a different scrambling code. After reading a MIB (e.g., either a new version or a copy), the UE 115 may then try different phases of a scrambling code until it gets a successful cyclic redundancy code (CRC) check. The phase of the scrambling code (e.g., 0, 1, 2, or 3) may enable the UE 115 to identify which of the four repetitions has been received. Thus, the UE 115 may determine the current SFN by reading the SFN in the decoded transmission and adding the scrambling code phase.

After receiving the MIB, a UE 115 may receive one or more SIBs. Different SIBs may be defined according to the type of system information conveyed. A new SIB1 may be transmitted in the fifth subframe of every eighth frame (i.e., SFN mod 8=0) and rebroadcast every other frame (e.g., every 20 ms). SIB1 may include access information, which may include cell identity information, and it may also indicate whether a UE 115 is allowed to camp on a base station 105. SIB1 may also include cell selection information or may include cell selection parameters. Additionally, SIB1 may include scheduling information for other SIBs. SIB2 may be scheduled dynamically according to information in SIB1 and may include access information and parameters related to common and shared channels. The periodicity of SIB2 can be set to 8, 16, 32, 64, 128, 256, or 512 radio frames. In some cases (e.g., in a system supporting eCC operation), a combination of synchronization signals, system information signals, and reference signals may be collectively known as DRS. eCC DRS may utilize some aspects of the corresponding non-eCC signals but may also be different based on aspects of eCC operation.

Thus, a base station 105 may transmit DRS in a narrowband region of primary channels of a carrier. The DRS may have a first PHY configuration based on a first orthogonal frequency division multiplexing (OFDM) symbol duration and tone spacing. A secondary channel of the carrier may support communications using a second PHY configuration based on a second OFDM symbol duration and tone spacing. A primary channel of the carrier outside the DRS transmission may support communications using either a first or a second PHY configuration based on either a first or a second OFDM symbol duration and tone spacing. In some cases the base station 105 may transmit a first system information (SI) message using the first PHY configuration and then transmit a second SI message using the second PHY configuration to support different sets of UEs 115. The different system information may be transmitted at different times or on different channels (e.g., the system information with the second PHY configuration may be sent on a secondary channel).

Figure 2:
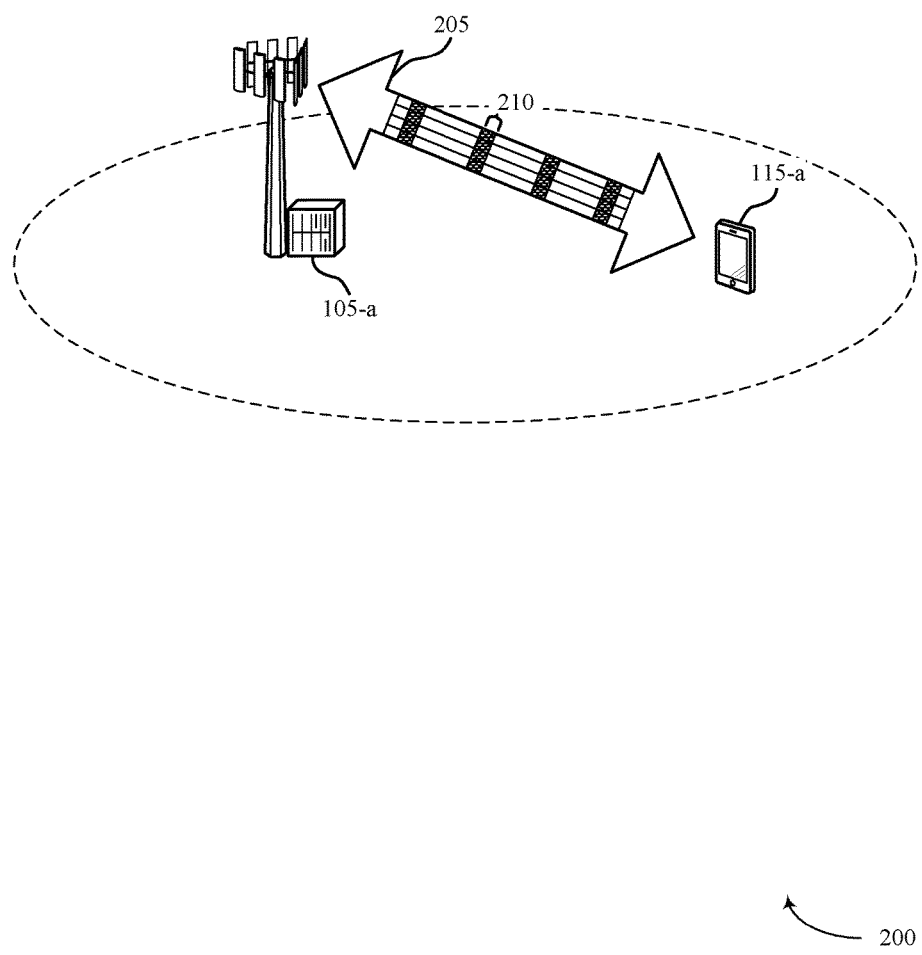
FIG. 2 illustrates an example of a wireless communications system that supports eCC DRS in accordance with aspects of the present disclosure.

FIG. 2 illustrates an example of a wireless communications system 200 for eCC DRS in accordance with aspects of the present disclosure. Wireless communications system 200 may include base station 105-a and UE 115-a, which may be examples of the corresponding devices described with reference to FIG. 1. Wireless communications system 200 may use eCCs to improve throughput, latency, and reliability. UE 115-a may rely on DRS to discover cells such as base station 105-a. Wireless communications system 200 may support multi-channel coexistence between eCC and non-eCC communications using a combined DRS configuration.

In some examples, an eCC is characterized by a short symbol duration (e.g., 16.67 µs as opposed to 66.7 µs), wide tone spacing (e.g., 75 kHz as opposed to 15 kHz), short subframe duration (e.g., 200 µs), operation in contention-based spectrum, or wide bandwidth (e.g., 80 MHz, 100 MHz, etc.). An eCC utilizing a contention-based or unlicensed radio frequency band may employ listen before talk (LBT) procedures, for instance. So eCC-based communication may also allow for design features that enable low-cost implementation, as compared to other communication systems (e.g., an 80 MHz deployment as opposed to multiple 20 MHz non-eCC carriers), due to an efficient PHY layer/medium access control (MAC) design.

In some cases, eCCs may be used as an evolution of shared access systems, such as a standalone deployment on the unlicensed spectrum, or a LAA system using a secondary carrier (e.g., an SCell) in an unlicensed spectrum in a CA configuration along with a primary carrier in licensed spectrum. eCC communication may also be over a licensed band (e.g., radio frequency spectrum bands licensed for particular uses), and may be associated with licensed shared access, such as an adaptive vertical sharing between an incumbent, priority access licensees (PALs), and general authorized access (GAA).

DRS may be used for initial acquisition, neighbor cell acquisition, and the measurements of serving and neighboring cells. DRS may include synchronization and/or reference signals (e.g., PSS, SSS, cell-specific reference signal (CRS), etc.), system information signals, and reference signals (e.g. CRS, channel state information reference signal (CSI-RS), etc.). The DRS may be transmitted quasi-periodically, and a DRS measurement timing configuration (DMTC) window may be defined periodically (e.g., every 80 ms). In some cases, the DRS may be transmitted within a DMTC window with the success of a CCA and there may be multiple DRS transmission opportunities within one DMTC window. In some cases, DRS may be transmitted by a base station 105 that is not capable of communicating using eCCs (i.e., a non-eCC base station 105).

In some cases, eCC synchronization signals, such as PSS and SSS, may be carried on the center six RBs (e.g., 1.08 MHz) and may allow for cell searching with a narrowband waveform and with a lower sampling rate (i.e., relative to an eCC sampling rate and a non-eCC sampling rate for data transmission over 20 MHz). In some cases, the synchronization signals may be spread across a channel. In some cases, the synchronization signal sequence may be transmitted via interleaved tones, and a new eCC synchronization signal sequence may be defined. Although, in some instances, this may introduce searching complexity due to fine time resolution. In other examples, the synchronization signal sequence may be transmitted on the center of the band with numerology associated with eCCs (e.g., eCC symbol duration, frequency gaps, etc.). For example, with a 75 kHz eCC subcarrier spacing and transmitted over 72 tones, the synchronization signals may occupy approximately 5 MHz. In some examples, the waveform containing synchronization signals may be transmitted using non-eCC numerology (e.g. 15 kHz subcarrier spacing, with PSS/SSS occupying the center 1 MHz). Alternately, a new sequence may be transmitted that UE 115-a may use to determine the timing, and once UE 115-a knows the timing, the synchronization signals may be used.

By way of example, base station 105-a may support both non-eCC and eCC communications. So base station 105-a may transmit both non-eCC DRS and eCC DRS to accommodate various types of UEs 115. An eCC may have a relatively wide system bandwidth (e.g., 80 MHz that may include multiple 20 MHz channels) as compared to a non-eCC carrier which may have a relatively smaller bandwidth (e.g., a single 20 MHz band). An eCC carrier may include one or more channels (e.g., four 20 MHz channels). In some cases, non-eCC UEs 115 may be served on primary channels (e.g., one primary 20 MHz channel), and as a result, non-eCC DRS may be transmitted only on primary channels. There may be one or more primary channels serving UEs 115.

In the case where the waveform containing synchronization signals is transmitted using non-eCC characteristics, for example, the center N resource blocks (e.g., where N=6) may contain the synchronization signals, such as PSS/SSS. The center N resource blocks may also contain an eMIB to convey system information, CRS, and CSI-RS. A DRS transmitted outside of the center N RBs may contain an eSIB1 to convey additional system information along with the associated reference signals and control channel information.

In some cases, a hybrid numerology for eCC DRS may be used. The DRS on the center band may use non-eCC numerology (e.g. 15 kHz tone spacing) and regions outside DRS within the channel may use eCC numerology (e.g. 75 kHz tone spacing). In some cases, guard bands may be used to reduce inter-carrier-interference. Additionally, UE 115-a may have two parallel hardware branches, such as a main data branch to process received symbols in 75 kHz tone spacing (i.e., such as to process received eCC data) and a narrow band or cell searcher branch to receive a DRS in the center band in 15 kHz tone spacing.

Figure 3A:
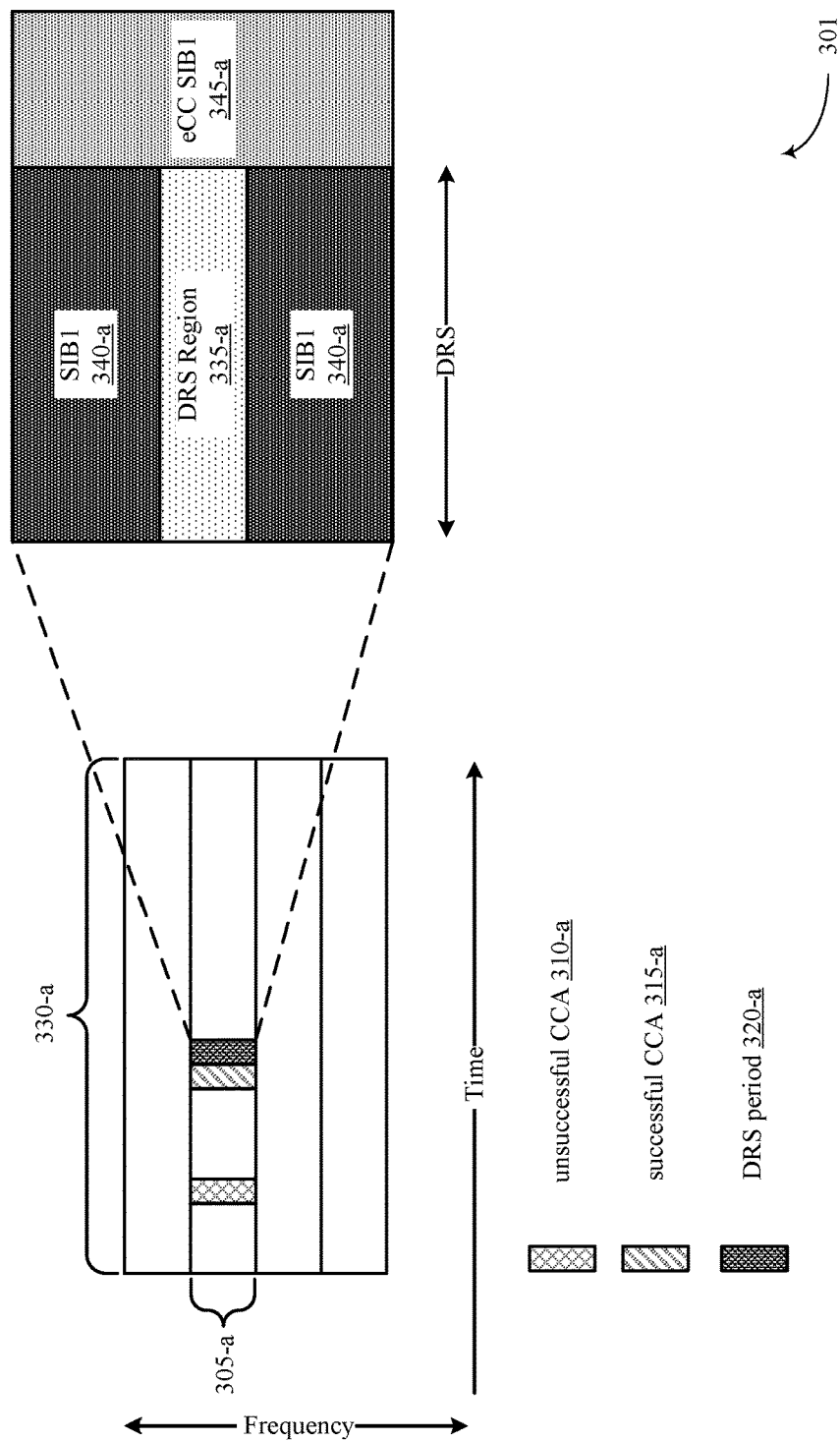
FIGS. 3A, 3B and 3C illustrates an example of DRS configurations that supports eCC DRS in accordance with aspects of the present disclosure.
Figure 3B:
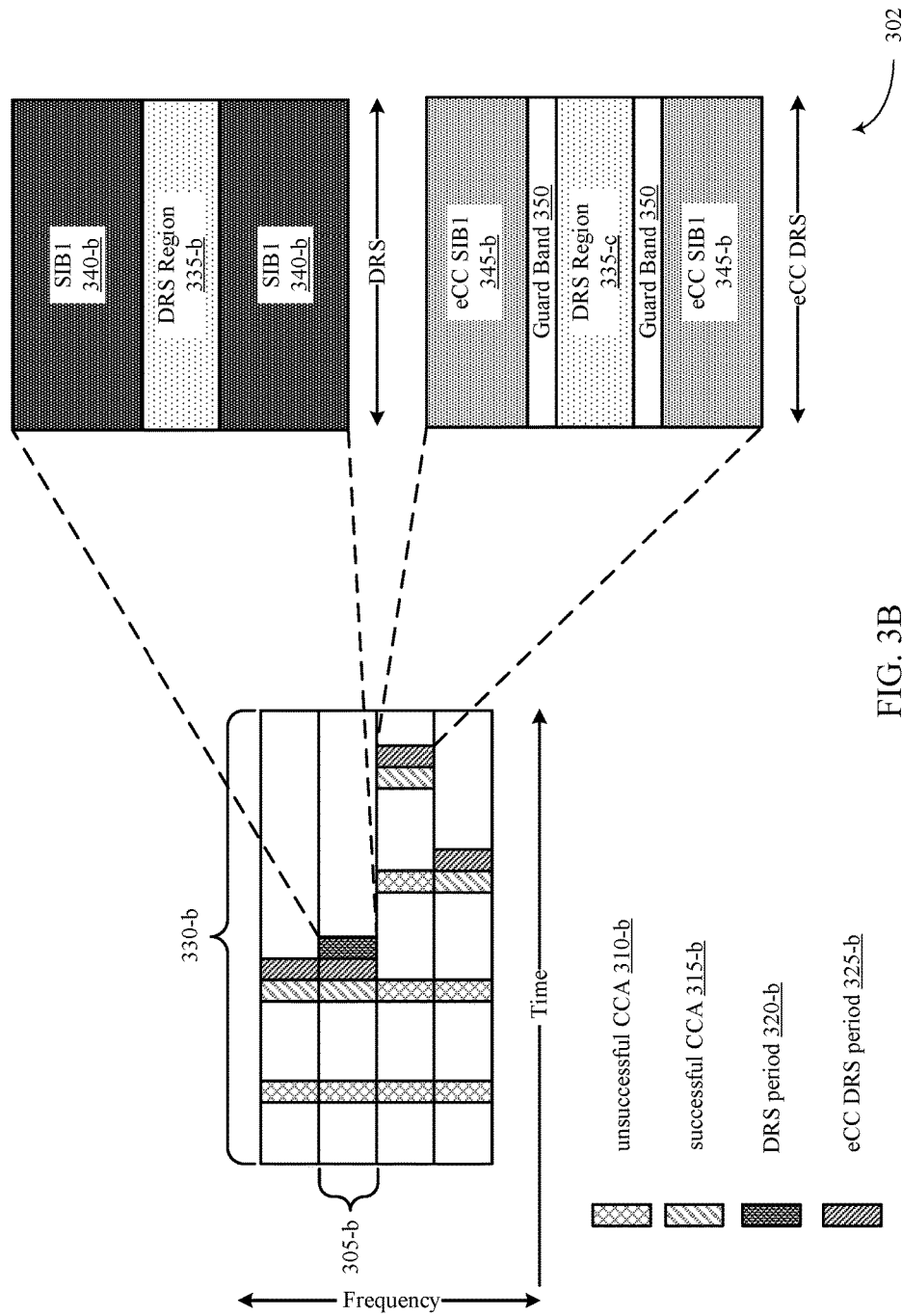
Figure 3C:
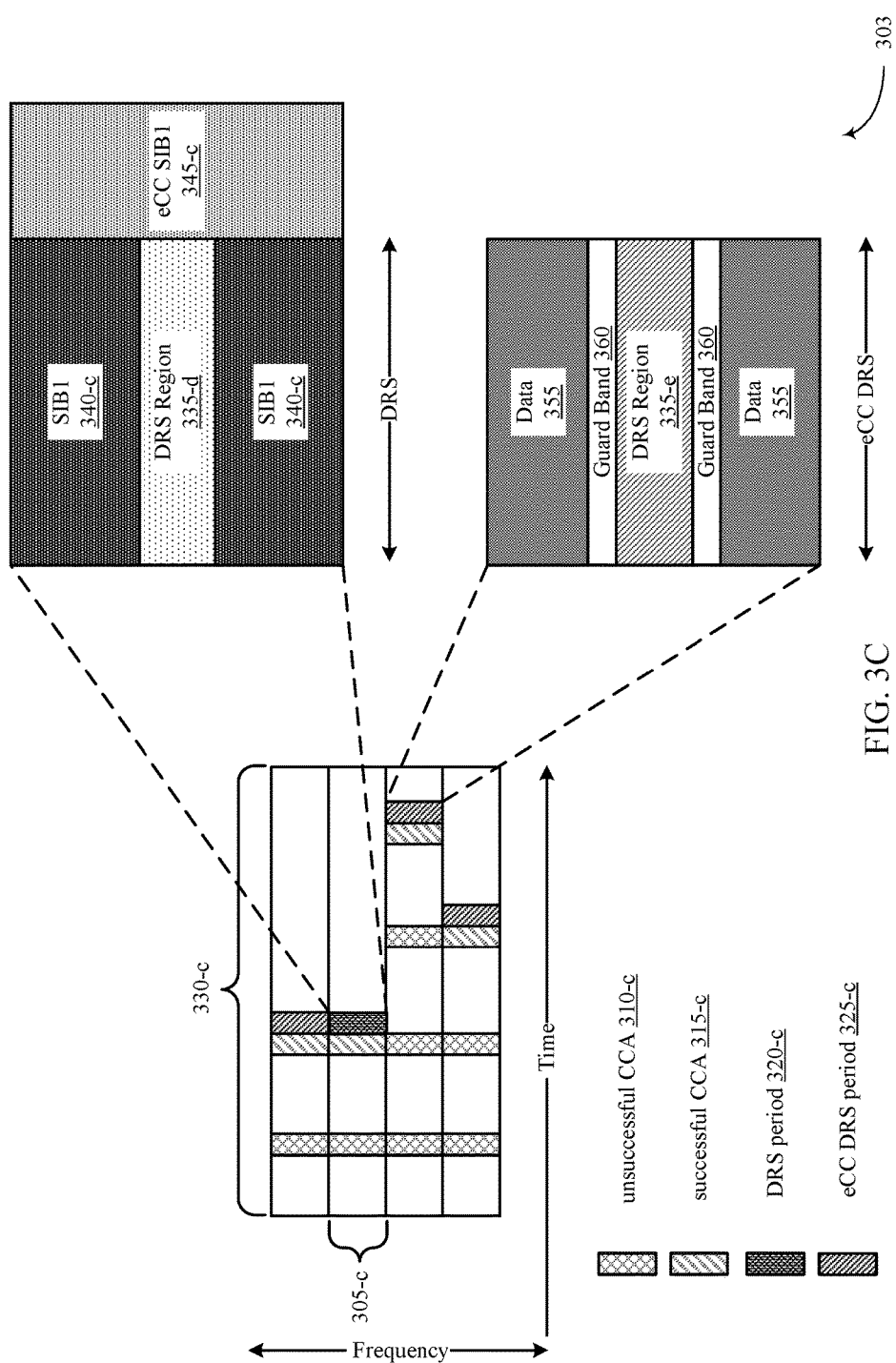

Several different options may exist for the transmission of DRS accommodating both eCC and non-eCC communication, including: transmitting a shared DRS over the primary channel only (e.g., as depicted in FIG. 3A), transmitting a separate DRS over all channels (e.g., as depicted in FIG. 3B), and transmitting a shared DRS over all channels (e.g., as depicted in FIG. 3C).

When a shared DRS is transmitted over a primary channel, there may not be a separate eCC DRS transmissions. However, in some cases an eCC SIB1 may be transmitted that contains distinct information, or indicates the difference relative to a preceding SIB1. The eCC SIB1 may use 75 kHz tone spacing. As a result, a non-eCC UE 115 may recognize only the non-eCC DRS portion. In some cases, the non-eCC DRS and eCC SIB1 may be transmitted as a new combined DRS. Additionally, the DRS may contain only non-eCC DRS and eCC SIB1 may be transmitted in a separate time/frequency occasion.

In some examples of an initial acquisition procedure where the shared DRS is transmitted over a primary channel, and as further described below with reference to FIG. 3A, the cell searcher branch may detect synchronizations signals and UE 115-a may detect the SIB1. eCC acquisition may follow, where the main hardware branch may read the eCC SIB1 over the primary channel and determine the bandwidth. As a result, the main data branch may open up to the system bandwidth.

Additionally or alternatively, a cell searcher branch may search for synchronization signals and the main data branch may read eCC SIB1 over a primary channel and determine the bandwidth. The main data branch may then open up to the system bandwidth. In some cases, UE 115-a may not know if base station 105-a is a non-eCC or eCC-capable base station 105 during initial acquisition. To resolve this, information regarding the eCC service may be carried in the eMIB, the SIB1, or may be conveyed through other manners within the DRS or the successful decoding of the eCC SIB1.

When base station 105-a wishes to obtain a measurement of neighboring cells, UE 115-a may perform a measurement of DRS of a neighboring cell. In some cases, the measurement may not tell UE 115-a the neighbor cells type (e.g., eCC or non-eCC) or the bandwidth associated with that cell. However, base station 105-a may utilize information obtained through other manners (e.g., X2 interface between eNBs, history of measurements, etc.) and accordingly interpret the measurement information obtained by UE 115-a and determine the cell type implicitly. In some cases, base station 105-a may request UE 115-a to perform a reading of a neighboring eMIB and/or SIB1 and report back neighboring cell information.

In some examples, base station 105-a may fail all CCA attempts on the primary channel, and as a result, base station 105-a may not send the DRS in the given DMTC window. Alternatively, DRS may be sent on a non-primary channel where CCA is successful. If DRS are sent on the non-primary channel, there may be further ambiguity among different types of UEs 115 regarding which channel to use. That is, some UEs 115 may determine that the non-primary channel carries non-eCC service or that the non-primary channel is an eCC channel. To resolve the potential ambiguity, base station 105-a may convey in the eMIB or SIB1 that there is no non-eCC service on the channel and that the channel is a non-primary channel of an eCC carrier.

When DRS transmission is separate and across all channels, the DRS may exist on all channels with a separate eCC DRS using non-eCC numerology on the center 6 RBs. In some examples of an initial acquisition procedure where a DRS transmission is separate and across all channels, and as further described below with reference to FIG. 3B, the cell searcher branch may search for synchronization signals on any channel and the main data branch may read eCC SIB1 over the channel and determine the bandwidth. The main data branch may then open up to the system bandwidth.

If the DRS transmission is separated and across all channels, there may be ambiguity regarding which UEs 115 are supported. For example, on the primary channel, there may be ambiguity regarding non-eCC UEs 115 that may detect eCC PSS/SSS as valid, but may have problems locating SIB1. Several steps may be taken to resolve this. For example, base station 105-a may convey information in eMIB indicating that there is non-eCC service. Similarly, on non-primary channels, steps may be taken to avoid ambiguity regarding UEs 115 that detect a valid PSS/SSS. Thus, information may again be conveyed in eMIB indicating that there is no non-eCC service available.

In some examples, a determination may be made about a base station's 105 capability of supporting eCC. For example, information regarding the availability of eCC service may be carried in eMIB, in SIB1, or may be conveyed through other manners within DRS. For example, different phase shift values may be used between two antenna ports to carry information (e.g., between CRS and CSI-RS ports). Alternately, successful decoding of eCC SIB1 may indicate eCC service. Additionally, for base station 105-a to obtain neighboring cell measurements, UE 115-a may know the neighboring cell type, and report the cell measurements over a frequency band (e.g., 20 MHz).

In other cases, and as further explained with reference to FIG. 3C below, there may be a transmission of a shared DRS across all channels. That is, a shared eCC DRS may be transmitted using non-eCC numerology on the center 6 RBs. It may be appropriate for UE 115-a to determine the primary band from the non-primary band using the center 6 RBs. In some cases, a different relative location of synchronization signals to one another (e.g., different locations of SSS with respect to SSS), including relative locations of synchronization signals within DRS, may be used. Alternately, the information regarding the primary or non-primary band may be contained in the eMIB, or different phase shift values may be used for primary and non-primary bands between two antenna ports.

In some cases, if UE 115-a detects base station 105-a on a non-primary channel, base station 105-a may convey information in eMIB or SIB1 that there is no non-eCC service on the channel and that the channel is a non-primary channel of an eCC carrier. Furthermore, the UE 115-a may determine that this channel is a part of eCC communication and search adjacent channels for the primary channel with known timing.

In some examples, UE 115-a may determine whether base station 105-a is non-eCC or eCC-capable during initial acquisition. The information may be conveyed on an eCC service indication carried in eMIB, the SIB1, or with another DRS indication. For example, different a phase shift may be used on CSI-RS to signal eCC capability. Alternately, if UE 115-a detects a non-primary channel first, UE 115-a may determine that base station 105-a is eCC-capable, and if the UE 115-a detects a primary channel first, it may attempt to detect an adjacent non-primary channel (e.g., assuming that a 20 MHz eCC system bandwidth is not present). For neighboring cell measurements when a shared DRS is transmitted across all channels, UE 115-a may report measurement per 20 MHz because it knows the neighbor cell's type.

In some examples, power scaling of transmissions may be appropriate to maintain a constant PSD for DRS transmissions (e.g., for proper measurement and to avoid interruption in ongoing data transmissions). In some cases, base station 105-a may use a fixed PSD on the center six RBs regardless of bandwidth of transmission. For example, in a 20 MHz transmission with 23 dBm transmission power, base station 105-a may use 10 dBm/MHz for the center six RBs. With an 80 MHz transmission with 23 dBm transmission power, although a flat PSD may translate to 4 dBm/MHz, the power may be boosted in the center 6 RBs and 10 dBm/MHz may still be used. As a result, the power on the other RBs may have to be lowered (e.g., de-boosted) to meet the overall 23 dBm transmission power.

FIG. 3A illustrates an example of a DRS configuration 301 that supports eCC DRS in accordance with aspects of the present disclosure. In some cases, DRS configuration 301 may represent aspects of techniques performed by a UE 115 or a base station 105 as described with reference to FIGS. 1-2. DRS configuration 301 may represent an example in which a shared DRS is used for a primary channel only. Primary channels may support both eCC and non-eCC communications, and secondary channels may support only eCC UEs.

In some cases, an eCC capable carrier may include multiple frequency bands. For example, an 80 MHZ eCC carrier may include four 20 Mhz channels such as channel 305-a. When operating in contention based spectrum, a base station may perform an LBT procedure (e.g., a CCA) prior to communicating on each channel. In some cases, there may be multiple DRS attempts preceded by an LBT procedure during one DMTC window 330-a. A base station may refrain from transmitting DRS after an unsuccessful CCA 310-a. However, after a subsequent LBT procedure on the same channel 305-a, a successful CCA 315-a may enable DRS to be transmitted. DRS period 320-a may include a combined DRS transmission (e.g., DRS that supports both eCC and non-eCC UEs 115). By way of example, DRS region 335-a, SIB1 340-a, and eCC SIB1 345-a may be each be transmitted in DRS period 320-a.

In some cases, when a shared DRS transmission is communicated over a primary channel there may not be a separate eCC DRS transmission. For example, the DRS period 320-a may include non-eCC SIB1 340-a in the portions of the frequency spectrum bordering the DRS region 335-a. The DRS region 335-a may include DRS such as synchronization signals PSS and SSS. The eCC SIB1 345-a may follow the DRS and may be a stand-alone SI message or may indicate any change or difference relative to a preceding SIB1 340-a. In some cases, a non-eCC UE 115 may not recognize eCC SIB1 345-a but may recognize only the non-eCC DRS portion of the DRS period 320-a, such as 335-a and SIB1 340-a.

As mentioned above, in some examples, where the shared DRS is transmitted over a primary channel, for instance, a cell-searcher branch of a UE 115, running with 15 kHz tone spacing and over narrowband, may detect synchronizations signals. The UE 115 subsequently may detect SIB1 340-a using a main hardware branch running with 15 kHz tone spacing. After that, the main data branch may switch to 75 kHz tone spacing, and eCC acquisition may take place, and a main hardware branch, running with 75 kHz tone spacing, may read the eCC SIB1 345-a over the primary channel, such as one of channel 305-a, and determine the bandwidth. As a result, the main data branch may open up to the system bandwidth. In an alternate example of system acquisition with shared DRS over the primary channel, a cell searcher branch, running with 15 kHz tone spacing and over narrowband, may search for synchronization signals in the DRS region 335-a, and the main data branch, running with 75 kHz tone spacing, may read eCC SIB1 345-a and determine the bandwidth. As a result the main data branch may open up to the system bandwidth. In some cases, an eCC UE 115 may not know if a base station 105 is a non-eCC or eCC-capable base station 105 during initial acquisition. To resolve this, information regarding the eCC service may be carried in the eMIB, the SIB1, or may be conveyed through other manners within the DRS period 320-a or the successful decoding of the eCC SIB1 345-a.

FIG. 3B illustrates an example of a DRS configuration 302 that supports eCC DRS in accordance with aspects of the present disclosure. In some cases, DRS configuration 302 may represent aspects of techniques performed by a UE 115 or base station 105 as described with reference to FIGS. 1-2. DRS configuration 302 may represent an example in which a separate DRS is used over all channels. Primary channels may support both eCC and non-eCC communications, and secondary channels may support only eCC UEs.

In some cases, there may be multiple DRS attempts during one DMTC window 330-b that covers all channels of an eCC carrier, such as channel 305-b. In some cases, an unsuccessful CCA 310-b may preclude the transmission of DRC. However, after a subsequent LBT procedure on channel 305-b, a successful CCA 315-b may allow DRS to be transmitted on the corresponding channel. In one case, a DRS period 320-b and/or an eCC DRS period 325-b may follow a successful CCA 315-b.

A DRS period 320-b may include non-eCC SIB1 340-b in the portions of the frequency spectrum bordering the DRS region 335-b (e.g., the center 6 RBs), where the DRS region 335-b may be used for transmission of the DRS. In some cases, the eCC DRS period 325-b may also include a DRS region 335-c bordered by an eCC SIB1 345-b. In some examples, eCC DRS period 325-b may also include a guard band 350 between the DRS region 335-c and the eCC SIB1 345-b regions.

In an example of an initial acquisition procedure where DRS transmissions for eCC and non-eCC are separated and across all channels, a cell searcher branch of a UE 115 may search for synchronization signals on any channel, and the main data branch may read eCC SIB1 345-b on a channel where eCC DRS transmission is present and determine the bandwidth. The main data branch may then open up to the system bandwidth.

FIG. 3C illustrates an example of a DRS configuration 303 that supports eCC DRS in accordance with aspects of the present disclosure. In some cases, DRS configuration 303 may represent aspects of techniques performed by a UE 115 or a base station 105 as described with reference to FIGS. 1-2. DRS configuration 303 may represent an example in which a shared DRS is used over all channels. Primary channels may support both eCC and non-eCC communications, and secondary channels may support only eCC UEs.

In DRS configuration 303, there may be multiple DRS attempts during one DMTC window 330-c that is transmitted across all channels such as channel 305-c. In some cases, an unsuccessful CCA 310-c may preclude the transmission of DRS on each channel. However, during a subsequent LBT procedure on channel 305-c, a successful CCA 315-c may allow DRS to be transmitted on the corresponding channel. A DRS period 320-c or an eCC DRS period 325-c may follow a successful CCA 315-c. In some examples, a DRS period 320-c, or a separate eCC DRS period 325-c, may exist on each channel.

In some examples, the DRS period 320-c may include a DRS region 335-d and SIB1 340-c that occupies the frequency spectrum bordering the DRS region 335-d, along with a subsequent eCC SIB1 345-c. The eCC DRS period 325-c may include a DRS region 335-e bordered by data 355. In some examples, eCC DRS period 325-c may also include a guard band 360 between the DRS region 335-e and the data 355 regions.

Figure 4:
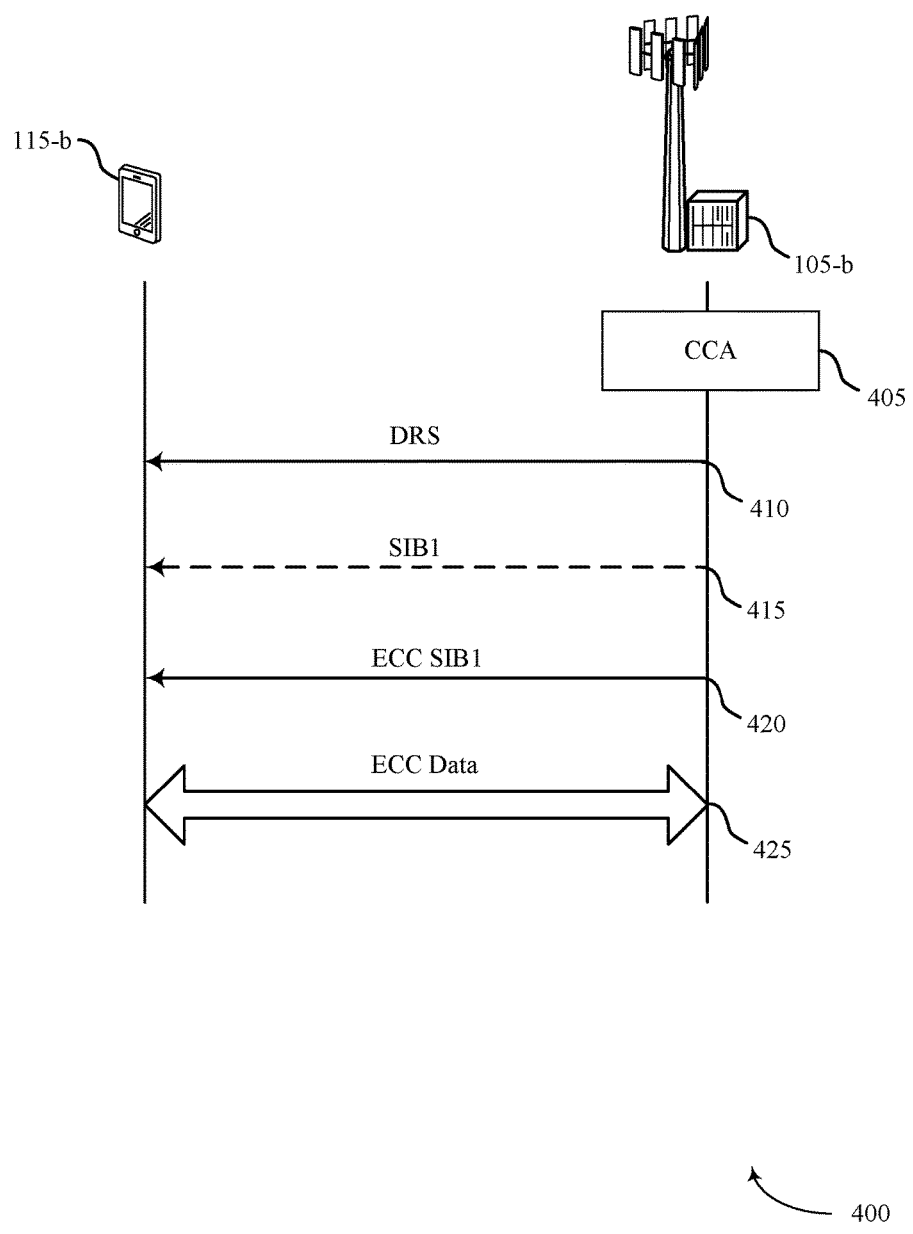
FIG. 4 illustrates an example of a process flow in a system that supports eCC DRS in accordance with aspects of the present disclosure.

FIG. 4 illustrates an example of a process flow 400 in a system that supports eCC DRS in accordance with various aspects of the present disclosure. Process flow 400 may include base station 105-*b* and UE 115-*b*, which may be examples of the corresponding devices described with reference to FIG. 1-2. Process flow 400 may represent techniques for transmission of DRS in a system that supports a first set of devices capable of communicating with a first OFDM symbol duration and tone spacing and a second set of devices that supports communication with a second OFDM symbol duration and tone spacing.

In some cases, the second set of devices may also be capable of communicating using the first OFDM symbol duration and tone spacing. In some cases, process flow 400 may be based on a carrier with multiple channels. Some channels, which may be referred to as primary channels, may support communication between base station 105-*b* and both sets of devices. Other channels, which may be referred to as non-primary channels or secondary channels, may support communication with the second set of devices.

At step 405, base station 105-*b* may perform a CCA to clear a channel for communication. In some cases, base station 105-*b* may determine that a plurality of CCA attempts on a primary channel were unsuccessful during a transmission window and refrain from transmitting DRS during the transmission window. In some cases, base station 105-*b* may determine that at least one first CCA attempt on a primary channel of the carrier was unsuccessful, determine that a second CCA attempt on a non-primary channel of the carrier was successful, and transmit one or several DRS on the non-primary channel based on the determination that the at least one first CCA attempt was unsuccessful and the determination that the second CCA attempt was successful. The non-primary channel may include the narrowband region of the carrier.

In some cases, UE 115-*b* may monitor a channel for one or more signals, such as a DRS, transmitted by base station 105-*b*. For example, base station 105-*b* may determine a location of one or more DRS (e.g., a narrowband region of a carrier) and map the DRS to a set of resources (e.g., resources within a first OFDM symbol period, resources having a first tone spacing, etc.). Base station 105-*b* may then transmit the one or more DRS to UE 105-*b* at step 410. UE 115-*b* may accordingly recognize the presence of one or more DRS based on the monitoring, and may receive the DRS transmitted from base station 105-*a* at step 410. Thus, UE 115-*b* and base station 105-*b* may identify DRS in a narrowband region of a carrier, and the DRS may use the first OFDM symbol duration and the first tone spacing. In some examples, the DRS include a PSS, an SSS, a MIB, a CRS, a CSI-RS, other signals or transmissions, or combinations thereof.

In some examples, base station 105-*b* may determine a duration to communicate with UE 115-*b*, such as a second region of the carrier. Base station 105-*b* may then identify and allocate resources within the second region of the carrier for communication. In such cases, UE 115-*b* may monitor for a region of the carrier in which to communicate and recognize the allocated communication resources within the second region of the carrier. Accordingly, base station 105-*b* and UE 115-*b* may identify the second region of the carrier, where the second region may support a second OFDM symbol duration and a second tone spacing.

In some cases, the DRS in the narrowband region of the carrier is identified using a first receiver (e.g., a cell searcher branch) that operates according to the first OFDM symbol duration and the first tone spacing. Communication in the second region of the carrier may use a second receiver (e.g., a main hardware branch) that operates according to the second OFDM symbol duration and the second tone spacing. In some cases, UE 115-*b* may perform a cell search or measurement procedure using the first receiver; the DRS may be identified based on the cell search or measurement procedure.

In some cases, at step 415 base station 105-*b* may transmit and UE 115-*b* may receive a non-eCC SIB1. For instance, base station 105-*b* may transmit the DRS and a first SI message during a first time period using the first OFDM symbol duration and the first tone spacing. In some cases, the second SI message comprises a difference relative to the first SI message.

At step 420, base station 105-*b* may transmit and UE 115-*b* may receive an eCC SIB1. That is, base station 105-*b* may transmit a second SI message during a second time period using the second OFDM symbol duration and the second tone spacing. In some cases, base station 105-*b* may transmit the DRS and a first SI message in a first channel of the carrier during a first time period, the first channel may support communication with both the first and the second set of devices; and may transmit additional DRS and a second SI message in a first channel or a second channel, or both the first and second channels, of the carrier during a second time period, the second channel may support communication with the second set of devices. In some cases, an additional DRS and SI message may also be transmitted in the first channel. In some cases, the first channel may be a primary channel of the carrier. That is, the first channel may support both the first set of devices and the second set of devices.

At step 425, base station 105-*b* and UE 115-*b* may transmit and receive data using an eCC. For example, base station 105-*b* and UE 115-*b* may communicate in the second region of the carrier using the second OFDM symbol duration and the second tone spacing. In some cases, base station 105-*b* may receive a measurement report from UE 115-*b* and determine that a neighbor base station 105 supports communication using the second OFDM symbol duration and the second tone spacing, or that the second OFDM symbol duration and the second tone spacing are unsupported by the neighbor base station based on the measurement report. In some cases, the measurement report comprises information for each channel that has a DRS used by the neighbor base station 105.

In some cases, base station 105-*b* may also determine a number of channels of a system bandwidth used by a neighbor base station based on the measurement report. For example, base station 105-*b* may determine that a neighbor base station's system bandwidth contains a single channel or multiple channels. In some cases, the measurement is performed over each channel that contains DRS (e.g., over each 20 MHz channel of a carrier), and a measurement report may include information for each channel that includes a DRS used by the neighbor base station.

Figure 5:
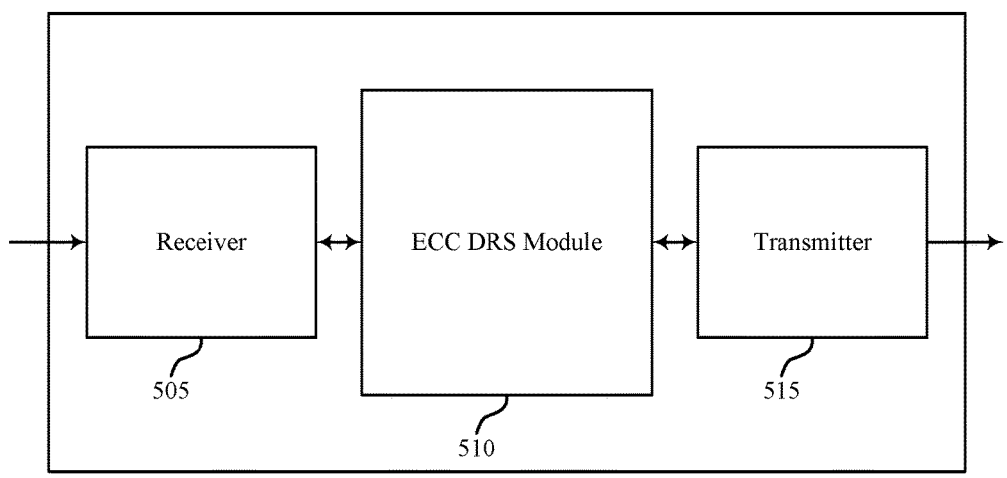
FIGS. 5 and 6 show block diagrams of a wireless device that supports eCC DRS in accordance with aspects of the present disclosure.

FIG. 5 shows a block diagram of a wireless device 500 that supports eCC DRS in accordance with various aspects of the present disclosure. Wireless device 500 may be an example of aspects of a UE 115 or base station 105 described with reference to FIGS. 1 and 2. Wireless device 500 may include receiver 505, eCC DRS module 510, and transmitter 515. Wireless device 500 may also include a processor. Each of these components may be in communication with one another.

The receiver 505 may receive information such as packets, user data, or control information associated with various information channels (e.g., control channels, data channels, and information related to eCC DRS, etc.). Information may be passed on to other components of the device. The receiver 505 may be an example of aspects of the transceiver 825 described with reference to FIG. 8 or transceiver 925 described with reference to FIG. 9.

The eCC DRS module 510 may identify DRS (e.g., one or more DRS) in a narrowband region of a carrier. In some cases, a second region (e.g., a region in which eCC data is transmitted) is identified by UEs detecting eCC transmission. The DRS may use the first OFDM symbol duration and the first tone spacing, and the second region may support the second OFDM symbol duration and the second tone spacing. The eCC DRS module 510, in combination with the receiver or transmitter, for instance, may communicate in the second region of the carrier using the second OFDM symbol duration and the second tone spacing. The eCC DRS module 510 may also be an example of aspects of the eCC DRS module 805 described with reference to FIG. 8 or eCC DRS module 905 described with reference to FIG. 9.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8 or transceiver 925 described with reference to FIG. 9. The transmitter 515 may include a single antenna, or it may include a plurality of antennas.

Figure 6:
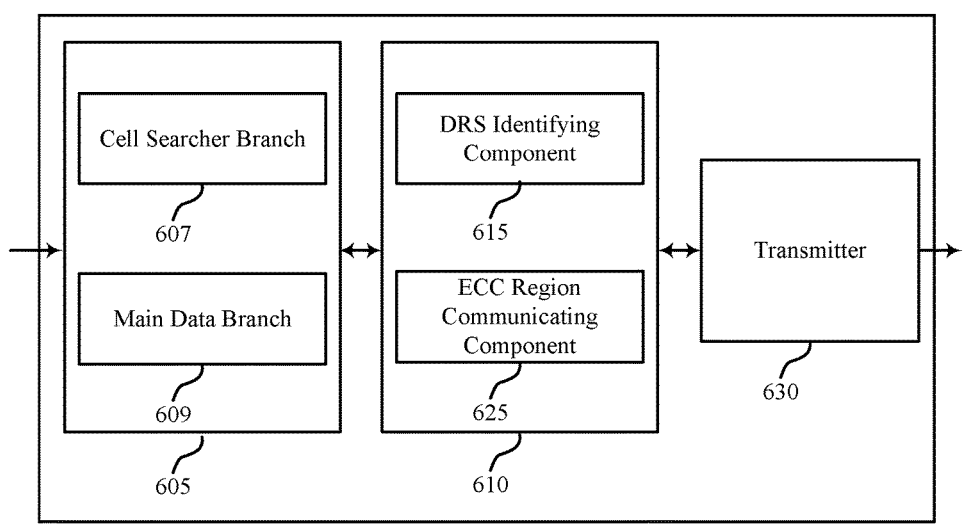

FIG. 6 shows a block diagram of a wireless device 600 that supports eCC DRS in accordance with various aspects of the present disclosure. Wireless device 600 may be an example of aspects of a wireless device 500 or a UE 115 or base station 105 described with reference to FIGS. 1, 2 and 5. Wireless device 600 may include receiver 605, eCC DRS module 610, and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8 or transceiver 925 described with reference to FIG. 9. The receiver 605 may also include or represent multiple receiver branches, such as cell searcher branch 607 and main data branch 609. The cell searcher branch 607 may run with (i.e., monitor and operate using) a first tone spacing (e.g., 15 kHz tone spacing over narrowband) and the main data branch 609 may run with (i.e., monitor and operate using) a second tone spacing (e.g., 75 kHz tone spacing over wideband), as described herein.

The eCC DRS module 610 may be an example of aspects of eCC DRS module 510 described with reference to FIG. 5. The eCC DRS module 610 may include DRS identifying component 615 and eCC region communicating component 625. The eCC DRS module 610 may be an example of aspects of the eCC DRS module 805 described with reference to FIG. 8 or eCC DRS module 905 described with reference to FIG. 9.

The DRS identifying component 615 may identify DRS in a narrowband region of a carrier. The DRS may use the first OFDM symbol duration and the first tone spacing. In some cases, the DRS includes a PSS, an SSS, a MIB, a CRS, a CSI-RS, or some combination of these signals. In some cases, the DRS are directed to the first set of devices and the second set of devices. The narrowband region of the carrier may include, for example, 6 or 8 center RBs of a channel of the carrier. In some cases, the narrowband region is bounded by a first guard band and a second guard band when the narrowband region is frequency-division multiplexed with a second region.

In some cases, a second region may support the second OFDM symbol duration and the second tone spacing. In some cases, the first OFDM symbol duration is greater than the second OFDM symbol duration and the first tone spacing is less than the second tone spacing. In some cases, the DRS in the narrowband region of the carrier may be identified using a first receiver that operates according to the first OFDM symbol duration and the first tone spacing, and the communication in the second region of the carrier may uses a second receiver that operates according to the second OFDM symbol duration and the second tone spacing. The eCC region communicating component 625 may communicate in the second region of the carrier using the second OFDM symbol duration and the second tone spacing.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8 or transceiver 925 described with reference to FIG. 9. The transmitter 630 may utilize a single antenna, or it may utilize a plurality of antennas.

Figure 7:
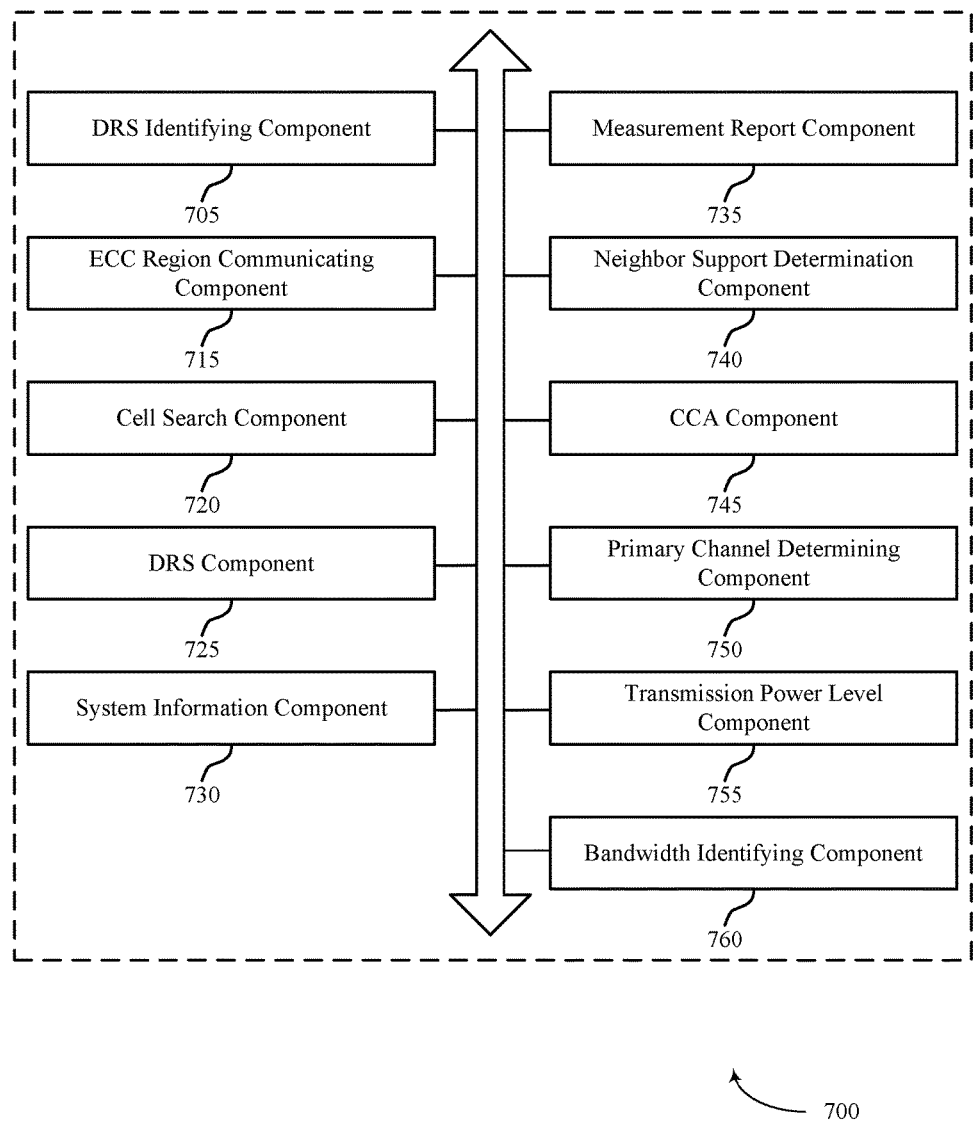
FIG. 7 shows a diagram of an eCC DRS module in accordance with aspects of the present disclosure.

FIG. 7 shows a block diagram of an eCC DRS module 700 in accordance with aspects of the present disclosure, which may be an example of the corresponding component of wireless device 500 or wireless device 600, which may represent aspects of a UE 115 or a base station 105. That is, eCC DRS module 700 may be an example of aspects of eCC DRS module 510 or eCC DRS module 610 described with reference to FIGS. 5 and 6. The eCC DRS module 700 may also be an example of aspects of the eCC DRS module 805 described with reference to FIG. 8 or eCC DRS module 905 described with reference to FIG. 9.

The eCC DRS module 700 may include DRS identifying component 705, eCC region identifying component 710, eCC region communicating component 715, cell search component 720, DRS component 725, system information component 730, measurement report component 735, neighbor support determination component 740, CCA component 745, primary channel determining component 750, transmission power level component 755 and bandwidth identifying component 760. Each of these modules may communicate, directly or indirectly, with one another (e.g., via one or more buses). In some cases, eCC DRS module 700 may include some of components described, but may exclude other components.

The DRS identifying component 705 may identify DRS in a narrowband region of a carrier, which may use the first OFDM symbol duration and the first tone spacing. The DRS identifying component 705 may be part of a cell searcher branch of a wireless device, as described above. In some cases, the DRS include a PSS, an SSS, a MIB, a CRS, a CSI-RS, or the like. In some cases, the DRS are directed to a first set of devices and a second set of devices.

In some cases, a second OFDM symbol duration and the second tone spacing. The eCC region identifying component 710 may be part of a main data branch of a wireless device, as described above. In some cases, the first OFDM symbol duration is greater than the second OFDM symbol duration and the first tone spacing is less than the second tone spacing. In some cases, the DRS in the narrowband region of the carrier are identified using a first receiver that operates according to the first OFDM symbol duration and the first tone spacing. Communication in the second region of the carrier may use a second receiver that operates according to the second OFDM symbol duration and the second tone spacing. The eCC region communicating component 715 may communicate in the second region of the carrier using the second OFDM symbol duration and the second tone spacing. The cell search component 720 may perform a cell search or measurement procedure using the first receiver and the DRS may be identified based on the cell search or measurement procedure.

The DRS component 725 may perform various operations in combination with other components or modules of wireless communication device, such as transmitter 515 or 630 described with reference to FIGS. 5 and 6. The DRS component 725 may transmit the DRS and a first SI message in a first channel of the carrier during a first time period and transmit additional DRS and a second SI message in a first channel or a second channel, or both, of the carrier during a second time period. The first channel may support communication with both the first and the second set of devices, and the second channel may support communication with the second set of devices. The DRS component 725 may transmit the DRS on the non-primary channel based on, for instance, a determination that the first CCA attempt was not successful and the determination that the second CCA attempt was successful. The non-primary channel may include the narrowband region of a carrier. The DRS component 725 may also transmit the DRS in a non-primary channel of the carrier. The DRS component 725 may, in some cases, transmit the DRS and a first SI message during a first time period using the first OFDM symbol duration and the first tone spacing.

In some cases, according to various operations of a wireless device (e.g., a UE 115 or base station 105), the DRS, the first SI message, and the second SI message are transmitted on a first channel that supports communication with the first set of devices and the second set of devices. In some cases, the DRS include an indication of whether communication using the first OFDM symbol duration and the first tone spacing is supported by a channel comprising the narrowband region.

The system information component 730 may, in combination with a transmitter 515 or 630, transmit a second SI message during a second time period using the second OFDM symbol duration and the second tone spacing. In some cases, the second SI message includes a difference relative to the first SI message. The measurement report component 735 may, in combination with receiver 605 described with reference to FIG. 6, receive a measurement report from a user equipment.

The neighbor support determination component 740 may determine a number of system bandwidth channels for a neighbor base station, that the neighbor base station supports communication using the second OFDM symbol duration and the second tone spacing or that the second OFDM symbol duration and the second tone spacing are unsupported by the neighbor base station based on the measurement report. In some examples, the neighbor support determination component 740 may determine a number of channels of a system bandwidth used by a neighbor base station based on a received measurement report. The measurement report may include information for each channel that includes a DRS used by the neighbor base station.

The CCA component 745 may determine that a plurality of CCA attempts on a primary channel was unsuccessful during a transmission window, refrain from transmitting the DRS during the transmission window, determine that a first CCA attempt on a primary channel of the carrier was unsuccessful, and determine that a second CCA on a non-primary channel of the carrier was successful.

The primary channel determining component 750 may determine whether a channel supports communication using the first OFDM symbol duration and the first tone spacing based on the DRS, an SI message, a phase shift between the DRS, or a successful decoding attempt of the SI message.

The transmission power level component 755 may identify a first transmission power level for the one or more DRS, and adjust a second transmission power level for the carrier based on the first transmission power level for the one or more DRS, a total transmission power for the carrier, and the bandwidth of the carrier. The first transmission power level may be independent of a bandwidth used for transmitting DRS, for example. The bandwidth identifying component 760 may identify a bandwidth of the carrier.

Figure 8:
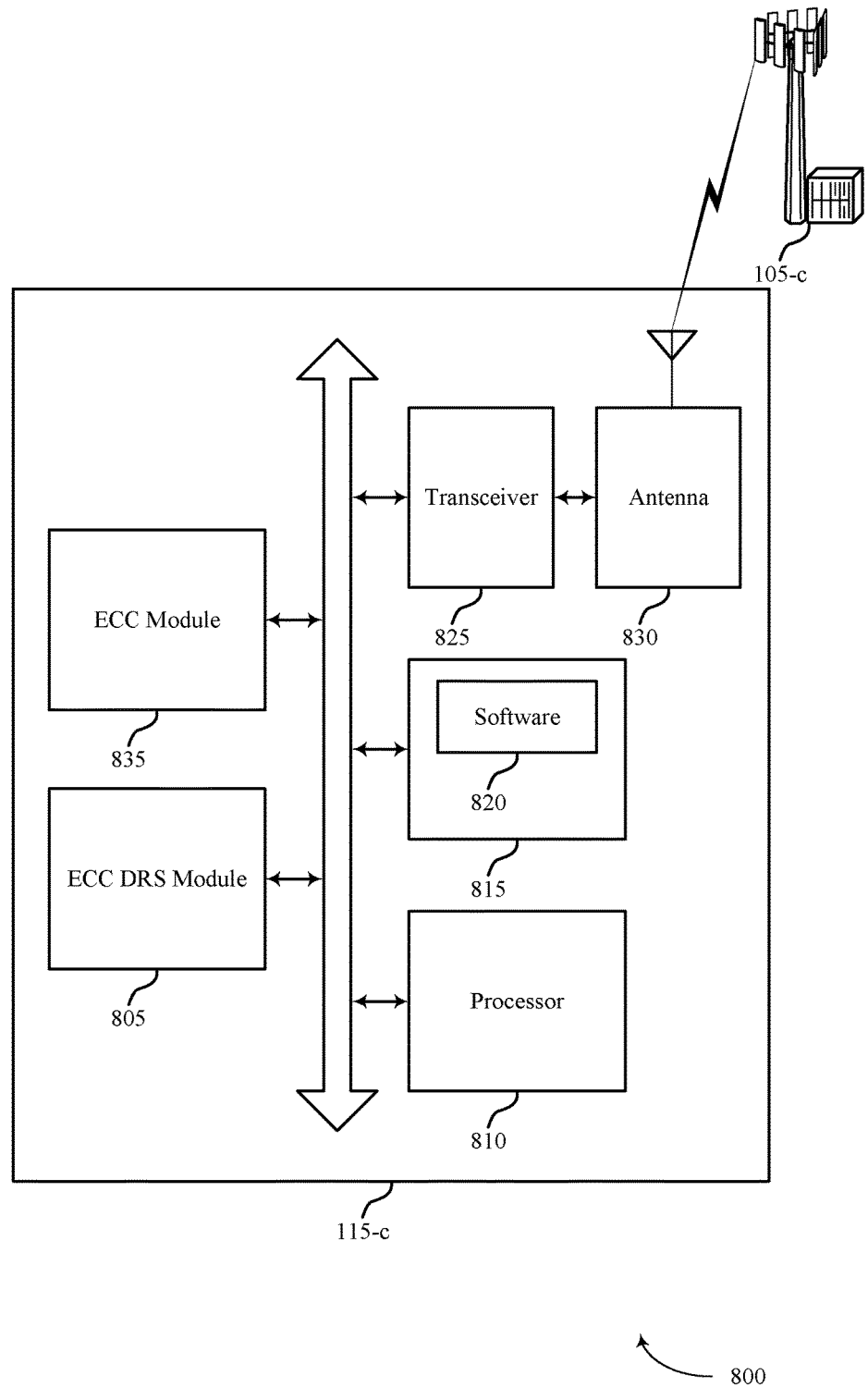
FIG. 8 shows a diagram of a wireless communications system including a device that supports eCC DRS in accordance with aspects of the present disclosure.

FIG. 8 shows a diagram of a wireless communications system 800 including a device that supports eCC DRS in accordance with various aspects of the present disclosure. For example, wireless communications system 800 may include UE 115-*c*, which may be an example of a wireless device 500, a wireless device 600, or a UE 115 as described with reference to FIGS. 1, 2 and 5 through 7.

UE 115-*c* may also include eCC DRS module 805, processor 810, memory 815, transceiver 825, antenna 830, and eCC module 835. Each of these modules may communicate, directly or indirectly, with one another (e.g., via one or more buses). The eCC DRS module 805 may be an example of a eCC DRS module as described with reference to FIGS. 5 through 7.

The processor 810 may include an intelligent hardware device, (e.g., a central processing unit (CPU), a microcontroller, an application specific integrated circuit (ASIC), etc.) The memory 815 may include random access memory (RAM) and read only memory (ROM). The memory 815 may store computer-readable, computer-executable software including instructions that, when executed, cause the processor, and thus UE 115-*c*, to perform various functions described herein (e.g., eCC DRS, etc.). In some cases, the software 820 may not be directly executable by the processor but may cause a computer (e.g., when compiled and executed) to perform functions described herein.

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions. The transceiver 825 may include parallel branches (e.g., cell search branch and main data branch), as described herein.

The eCC module 835 may enable operations using eCCs such as communication using shared or unlicensed spectrum, using reduced TTIs or subframe durations, or using a large number of component carriers (CCs).

Figure 9:
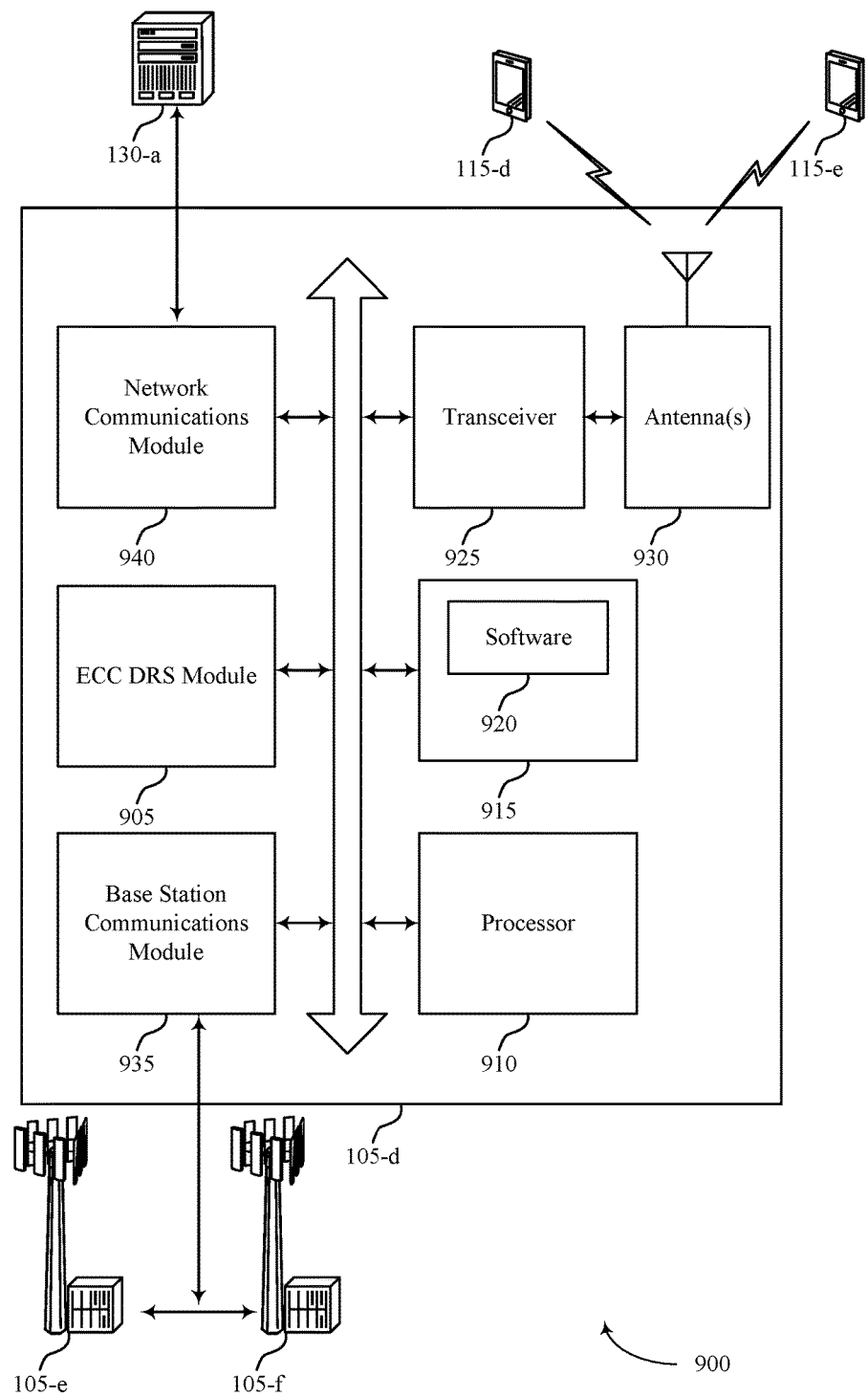
FIG. 9 shows a diagram of a system including a device that supports eCC DRS in accordance with aspects of the present disclosure.

FIG. 9 shows a diagram of a wireless system 900 including a device that supports eCC DRS in accordance with various aspects of the present disclosure. For example, wireless system 900 may include base station 105-*d*, which may be an example of a wireless device 500, a wireless device 600, or a base station 105 as described with reference to FIGS. 1, 2 and 5 through 7. Base station 105-*d* may also include components for bi-directional voice and data communications including components for transmitting communications and components for receiving communications. For example, base station 105-*d* may communicate bi-directionally with one or more UEs 115.

Base station 105-*d* may also include an eCC DRS module 905, processor 910, memory 915, transceiver 925, antenna 930, base station communications module 935, and network communications module 940. Each of these modules may communicate, directly or indirectly, with one another (e.g., via one or more buses). The eCC DRS module 905 may be an example of an eCC DRS module as described with reference to FIGS. 5 through 7.

The processor 910 may include an intelligent hardware device, (e.g., a CPU, a microcontroller, an ASIC, etc.) The memory 915 may include RAM and ROM. The memory 915 may store computer-readable, computer-executable software including instructions that, when executed, cause the processor, and thus base station 105-*d*, to perform various functions described herein (e.g., eCC DRS, etc.). In some cases, the software 920 may not be directly executable by the processor but may cause a computer (e.g., when compiled and executed) to perform functions described herein.

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

The base station communications module 935 may manage communications with other base station 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
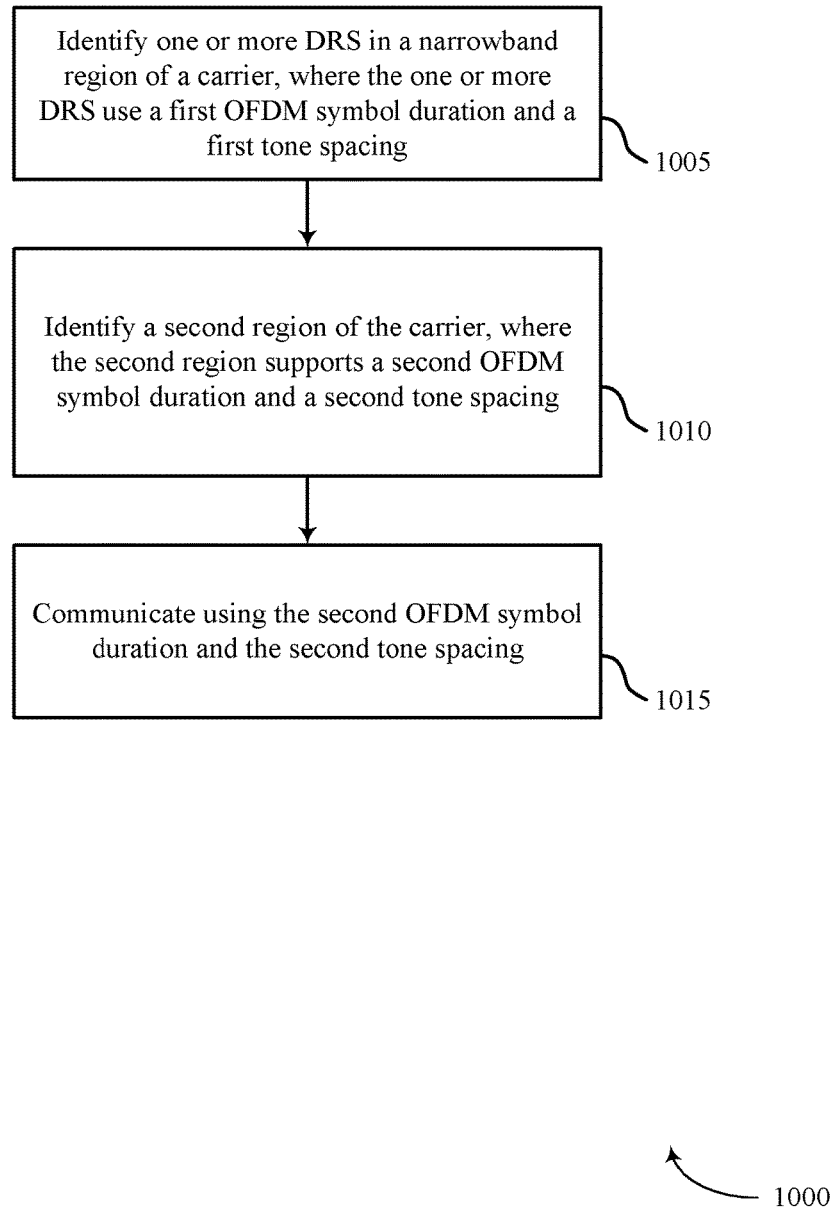
FIGS. 10 through 13 show flowcharts illustrating methods for eCC DRS in accordance with aspects of the present disclosure.

FIG. 10 shows a flowchart illustrating a method 1000 for eCC DRS in accordance with various aspects of the present disclosure. The operations of method 1000 may be implemented by a UE 115 or base station 105 or its components as described with reference to FIGS. 1 and 2. For example, the operations of method 1000 may be performed by the eCC DRS module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1005, the UE 115 or base station 105 may identify one or more DRS in a narrowband region of a carrier, where the one or more DRS use the first OFDM symbol duration and the first tone spacing as described above with reference to FIGS. 2 through 4. In certain examples, the operations of block 1005 may be performed by the DRS identifying component as described with reference to FIG. 7.

At block 1010, the UE 115 or base station 105 may identify a second region of the carrier, where the second region supports the second OFDM symbol duration and the second tone spacing as described above with reference to FIGS. 2 through 4. In certain examples, the operations of block 1010 may be performed by the eCC DRS module as described with reference to FIG. 6.

At block 1015, the UE 115 or base station 105 may communicate using the second OFDM symbol duration and the second tone spacing as described above with reference to FIGS. 2 through 4. This communication may be in, for example, the second region of the carrier. In certain examples, the operations of block 1015 may be performed by the eCC region communicating component as described with reference to FIG. 7.

Figure 11:
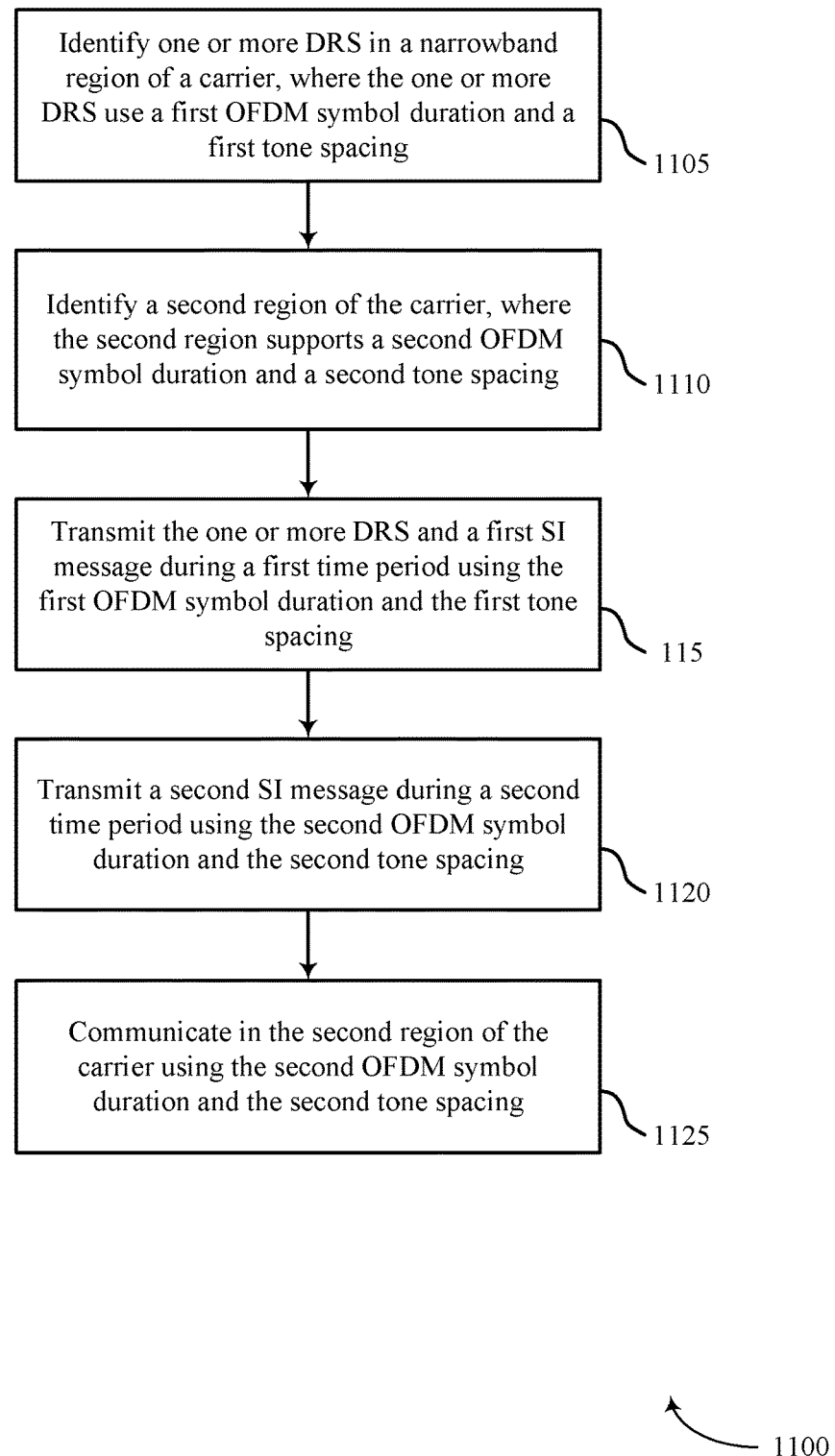

FIG. 11 shows a flowchart illustrating a method 1100 for eCC DRS in accordance with various aspects of the present disclosure. The operations of method 1100 may be implemented by a UE 115 or base station 105 or its components as described with reference to FIGS. 1 and 2. For example, the operations of method 1100 may be performed by the eCC DRS module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may identify one or more DRS in a narrowband region of a carrier, where the one or more DRS use the first OFDM symbol duration and the first tone spacing as described above with reference to FIGS. 2 through 4. In certain examples, the operations of block 1105 may be performed by the DRS identifying component as described with reference to FIG. 7.

At block 1110, the UE 115 or base station 105 may identify a second region of the carrier, where the second region supports the second OFDM symbol duration and the second tone spacing as described above with reference to FIGS. 2 through 4. In certain examples, the operations of block 1110 may be performed by the eCC DRS module as described with reference to FIG. 6.

At block 1115, the UE 115 or base station 105 may transmit the one or more DRS and a first SI message during a first time period using the first OFDM symbol duration and the first tone spacing as described above with reference to FIGS. 2 through 4. In certain examples, the operations of block 1115 may be performed by the DRS component as described with reference to FIG. 7.

At block 1120, the UE 115 or base station 105 may transmit a second SI message during a second time period using the second OFDM symbol duration and the second tone spacing as described above with reference to FIGS. 2 through 4. In certain examples, the operations of block 1120 may be performed by the system information component as described with reference to FIG. 7.

At block 1125, the UE 115 or base station 105 may communicate in the second region of the carrier using the second OFDM symbol duration and the second tone spacing as described above with reference to FIGS. 2 through 4. In certain examples, the operations of block 1125 may be performed by the eCC region communicating component as described with reference to FIG. 7.

Figure 12:
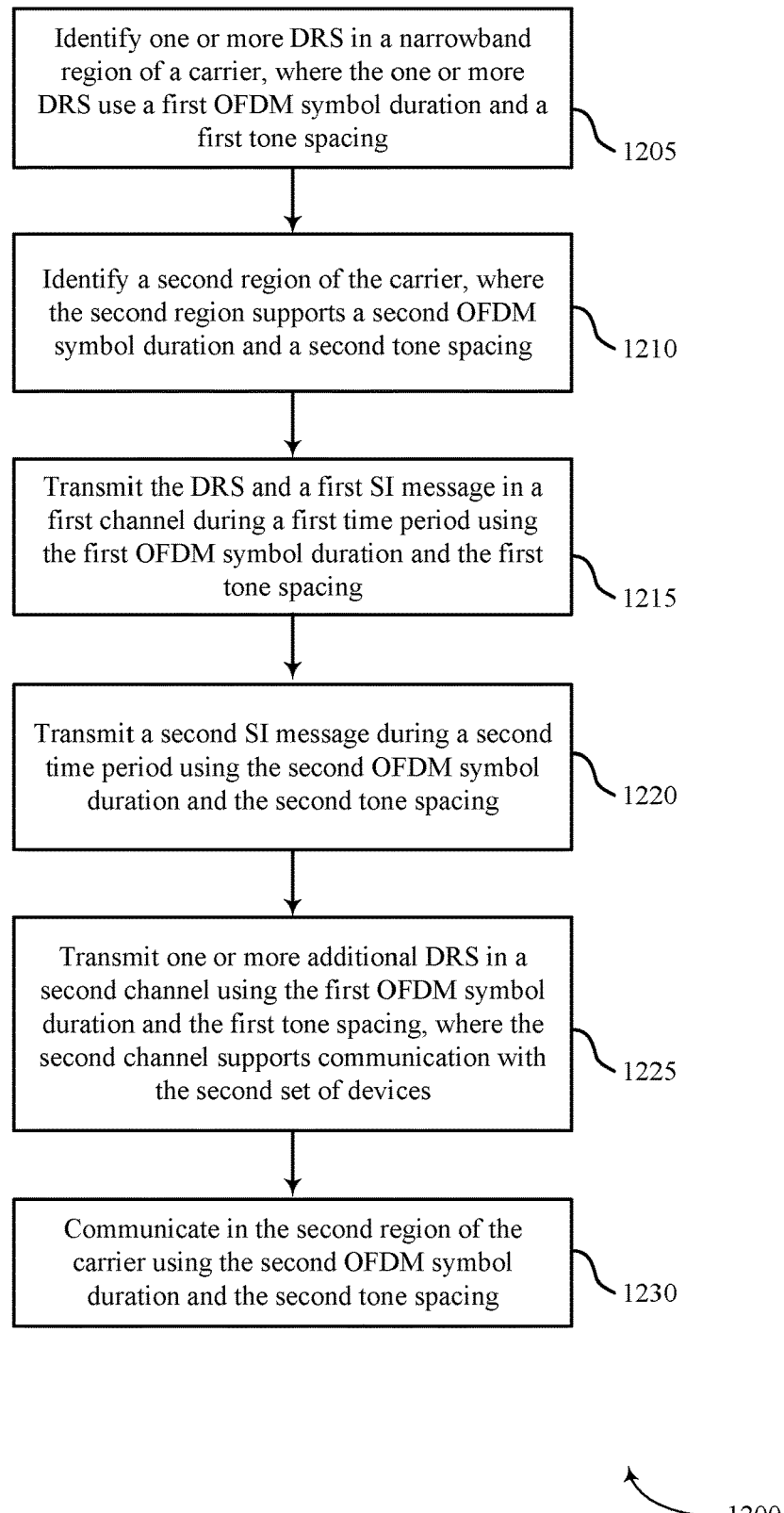

FIG. 12 shows a flowchart illustrating a method 1200 for eCC DRS in accordance with various aspects of the present disclosure. The operations of method 1200 may be implemented by a UE 115 or base station 105 or its components as described with reference to FIGS. 1 and 2. For example, the operations of method 1200 may be performed by the eCC DRS module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify one or more DRS in a narrowband region of a carrier, where the one or more DRS use the first OFDM symbol duration and the first tone spacing as described above with reference to FIGS. 2 through 4. In certain examples, the operations of block 1205 may be performed by the DRS identifying component as described with reference to FIG. 7.

At block 1210, the UE 115 or base station 105 may identify a second region of the carrier, where the second region supports the second OFDM symbol duration and the second tone spacing as described above with reference to FIGS. 2 through 4. In certain examples, the operations of block 1210 may be performed by the eCC DRS module as described with reference to FIG. 6.

At block 1215, the UE 115 or base station 105 may transmit the one or more DRS and a first SI message during a first time period using the first OFDM symbol duration and the first tone spacing as described above with reference to FIGS. 2 through 4. In certain examples, the operations of block 1215 may be performed by the discovery reference signal component as described with reference to FIG. 7.

At block 1220, the UE 115 or base station 105 may transmit a second SI message during a second time period using the second OFDM symbol duration and the second tone spacing as described above with reference to FIGS. 2 through 4. In some cases, the one or more DRS, the first SI message, and the second SI message are transmitted on a first channel that supports communication with the first set of devices and the second set of devices. In certain examples, the operations of block 1220 may be performed by the system information component as described with reference to FIG. 7.

At block 1225, the UE 115 or base station 105 may transmit one or more additional DRS in a second channel using the first OFDM symbol duration and the first tone spacing, where the second channel supports communication with the second set of devices as described above with reference to FIGS. 2 through 4. In certain examples, the operations of block 1225 may be performed by the DRS component as described with reference to FIG. 7.

At block 1230, the UE 115 or base station 105 may communicate in the second region of the carrier using the second OFDM symbol duration and the second tone spacing as described above with reference to FIGS. 2 through 4. In certain examples, the operations of block 1230 may be performed by the eCC region communicating component as described with reference to FIG. 7.

Figure 13:
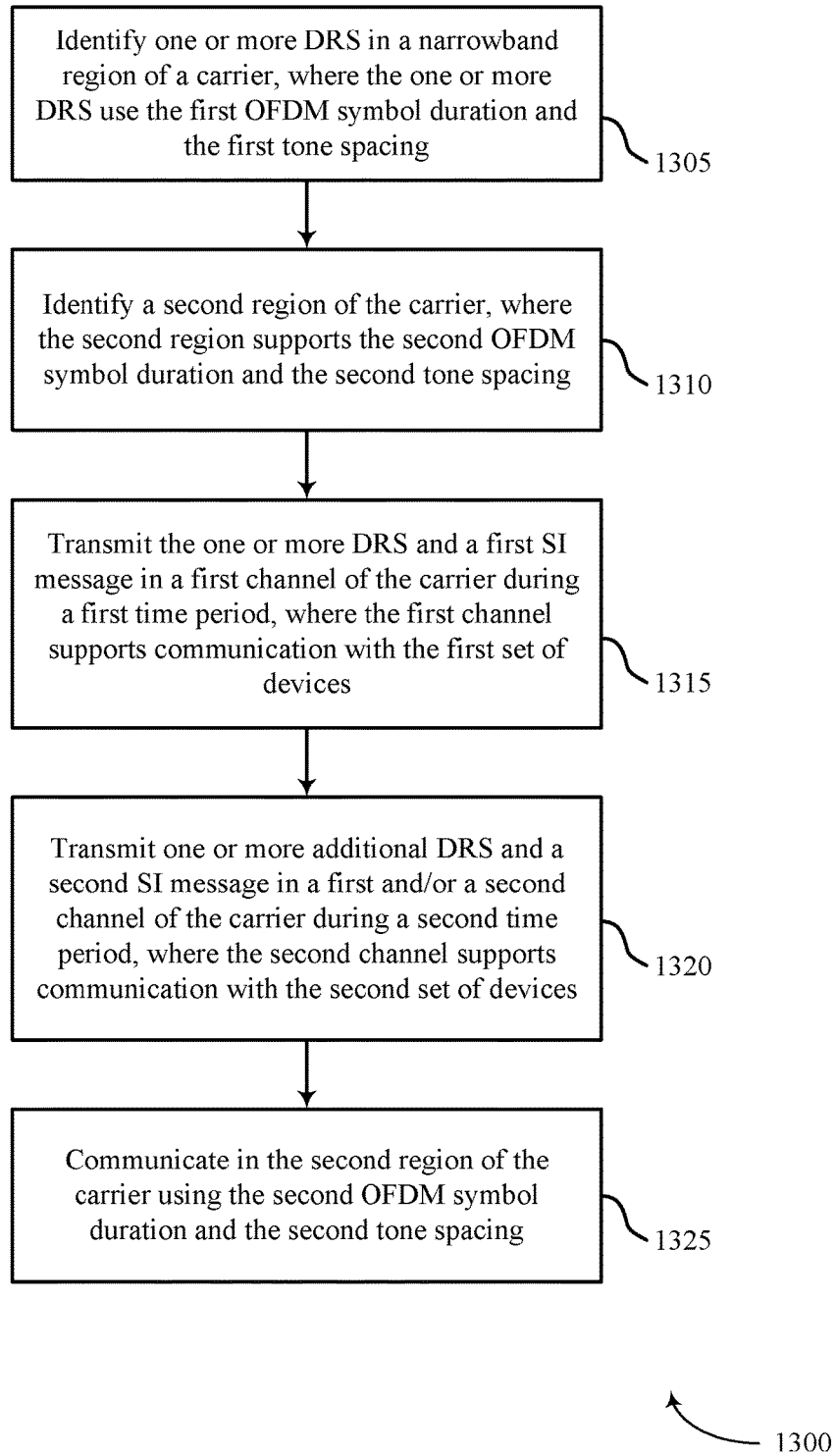

FIG. 13 shows a flowchart illustrating a method 1300 for eCC DRS in accordance with various aspects of the present disclosure. The operations of method 1300 may be implemented by a UE 115, base station 105, or its components as described with reference to FIGS. 1 and 2. For example, the operations of method 1300 may be performed by the eCC DRS module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may identify one or more DRS in a narrowband region of a carrier, where the one or more DRS use the first OFDM symbol duration and the first tone spacing as described above with reference to FIGS. 2 through 4. In certain examples, the operations of block 1305 may be performed by the discovery reference signal identifying component as described with reference to FIG. 7.

At block 1310, the UE 115 or base station 105 may identify a second region of the carrier, where the second region supports the second OFDM symbol duration and the second tone spacing as described above with reference to FIGS. 2 through 4. In certain examples, the operations of block 1010 may be performed by the eCC DRS module as described with reference to FIG. 6.

At block 1315, the UE 115 or base station 105 may transmit the one or more DRS and a first SI message in a first channel of the carrier during a first time period, where the first channel supports communication with the first set of devices and the second set of devices as described above with reference to FIGS. 2 through 4. In certain examples, the operations of block 1315 may be performed by the DRS component as described with reference to FIG. 7.

At block 1320, the UE 115 or base station 105 may transmit one or more additional DRS and a second SI message in the first channel and a second channel of the carrier during a second time period, where second channel supports communication with the second set of devices as described above with reference to FIGS. 2 through 4. In certain examples, the operations of block 1320 may be performed by the DRS component as described with reference to FIG. 7.

At block 1325, the UE 115 or base station 105 may communicate in the second region of the carrier using the second OFDM symbol duration and the second tone spacing as described above with reference to FIGS. 2 through 4. In certain examples, the operations of block 1325 may be performed by the eCC region communicating component as described with reference to FIG. 7.

It should be noted that these methods describe possible implementations, and that the operations and the steps may be rearranged or otherwise modified such that other implementations are possible. In some examples, aspects from two or more of the methods 1000, 1100, 1200, or 1300 described with reference to FIG. 10, 11, 12, or 13 may be combined. It should be noted that the methods 1000, 1100, 1200, and 1300 are just example implementations, and that the operations of the methods 1000, 1100, 1200, and 1300 may be arranged or otherwise modified such that other implementations are possible. For example, aspects of each of the methods 1000, 1100, 1200, or 1300 may include steps or aspects of the other methods, or other steps or techniques described herein. Thus, aspects of the disclosure may provide for eCC DRS.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for eCC DRS. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., structured/platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication in a system that supports communication with a first set of devices using a first orthogonal frequency division multiplexing (OFDM) symbol duration associated with a first tone spacing and second set of devices using a second OFDM symbol duration associated with a second tone spacing, wherein the second tone spacing is different than the first tone spacing and the second OFDM symbol duration is different than the first OFDM symbol duration, the method comprising:
   performing a cell search or measurement procedure using a first receiver that operates according to the first OFDM symbol duration and the first tone spacing;
   identifying one or more discovery reference signals (DRS) in a narrowband region of a carrier based at least in part on the cell search or measurement procedure, wherein the one or more DRS use the first OFDM symbol duration and the first tone spacing;
   identifying a second region of the carrier, wherein the second region supports the second OFDM symbol duration and the second tone spacing, wherein the first OFDM symbol duration is greater than the second OFDM symbol duration and the first tone spacing is less than the second tone spacing; and
   communicating in the second region of the carrier using the second OFDM symbol duration and the second tone spacing.

2. The method of claim 1, wherein the communication in the second region of the carrier uses a second receiver that operates according to the second OFDM symbol duration and the second tone spacing.

3. The method of claim 1, further comprising:
   transmitting the one or more DRS and a first system information (SI) message during a first time period using the first OFDM symbol duration and the first tone spacing; and
   transmitting a second SI message during a second time period using the second OFDM symbol duration and the second tone spacing.

4. The method of claim 3, wherein the second SI message comprises a difference relative to the first SI message.

5. The method of claim 3, wherein the one or more DRS, the first SI message, and the second SI message are transmitted on a first channel that supports communication with the first set of devices and the second set of devices, the method further comprising:

transmitting one or more additional DRS in a second channel using the first OFDM symbol duration and the first tone spacing, wherein the second channel supports communication with the second set of devices.

6. The method of claim 1, further comprising:
transmitting the one or more DRS and a first system information (SI) message in a first channel of the carrier during a first time period, wherein the first channel supports communication with the first set of devices and the second set of devices; and
transmitting one or more additional DRS and a second SI message in the first channel and a second channel of the carrier during a second time period, wherein the second channel supports communication with the second set of devices.

7. The method of claim 1, further comprising:
receiving a measurement report from a user equipment (UE); and
determining a number of system bandwidth channels for a neighbor base station, that the neighbor base station supports communication using the second OFDM symbol duration and the second tone spacing or that the second OFDM symbol duration and the second tone spacing are unsupported by the neighbor base station based at least in part on the measurement report.

8. The method of claim 1, further comprising:
receiving a measurement report from a user equipment (UE); and
determining a number of channels of a system bandwidth used by a neighbor base station based at least in part on the measurement report.

9. The method of claim 8, wherein the measurement report comprises information for each channel that comprises a DRS used by the neighbor base station.

10. The method of claim 1, further comprising:
determining that a plurality of clear channel assessment (CCA) attempts on a primary channel was unsuccessful during a transmission window; and
refraining from transmitting the one or more DRS during the transmission window.

11. The method of claim 1, further comprising:
determining that a first CCA attempt on a primary channel of the carrier was unsuccessful;
determining that a second CCA attempt on a non-primary channel of the carrier was successful; and
transmitting the one or more DRS on the non-primary channel based at least in part on the determination that the first CCA attempt was unsuccessful and the determination that the second CCA attempt was successful, wherein the non-primary channel comprises the narrowband region of the carrier.

12. The method of claim 1, wherein the one or more DRS comprise an indication of whether communication using the first OFDM symbol duration and the first tone spacing is supported by a channel comprising the narrowband region.

13. The method of claim 1, further comprising:
determining whether a channel supports communication using the first OFDM symbol duration and the first tone spacing based at least in part on the one or more DRS, an SI message, a phase shift between different pilots within the one or more DRS, a relative location of a secondary synchronization signal (SSS) with respect to a primary synchronization signal (PSS) within DRS, or a successful decoding attempt of the SI message.

14. The method of claim 1, further comprising:
identifying a first transmission power level for the one or more DRS, wherein the first transmission power level is independent of a bandwidth occupied by a transmission containing the one or more DRS;
identifying a bandwidth of the carrier; and
adjusting a second transmission power level for a region outside the bandwidth occupied by the transmission containing the one or more DRS based at least in part on the first transmission power level for the one or more DRS, a total transmission power for the carrier, or the bandwidth occupied by the transmission containing the one or more DRS, or a combination thereof.

15. The method of claim 1, wherein the one or more DRS comprises a primary synchronization signal (PSS), a secondary synchronization signal (SSS), a master information block (MIB), a cell-specific reference signals (CRS), a channel state information reference signal (CSI-RS), or any combination thereof.

16. The method of claim 1, wherein the one or more DRS are directed to the first set of devices and the second set of devices.

17. The method of claim 1, wherein the narrowband region of the carrier comprises six (6) or eight (8) center resource blocks (RBs) of a channel of the carrier.

18. The method of claim 1, wherein the narrowband region is bounded by a first guard band and a second guard band when the narrowband region is frequency-division multiplexed with the second region of the carrier.

19. An apparatus for wireless communication in a system that supports communication with a first set of devices using a first orthogonal frequency division multiplexing (OFDM) symbol duration associated with a first tone spacing and second set of devices using a second OFDM symbol duration associated with a second tone spacing, wherein the second tone spacing is different than the first tone spacing and the second OFDM symbol duration is different than the first OFDM symbol duration, the apparatus comprising:
means for performing a cell search or measurement procedure using a first receiver that operates according to the first OFDM symbol duration and the first tone spacing;
means for identifying one or more discovery reference signals (DRS) in a narrowband region of a carrier based at least in part on the cell search or measurement procedure, wherein the one or more DRS use the first OFDM symbol duration and the first tone spacing;
means for identifying a second region of the carrier, wherein the second region supports the second OFDM symbol duration and the second tone spacing, wherein the first OFDM symbol duration is greater than the second OFDM symbol duration and the first tone spacing is less than the second tone spacing; and
means for communicating in the second region of the carrier using the second OFDM symbol duration and the second tone spacing.

20. An apparatus for wireless communication in a system that supports communication with a first set of devices using a first orthogonal frequency division multiplexing (OFDM) symbol duration associated with a first tone spacing and second set of devices using a second OFDM symbol duration associated with a second tone spacing, wherein the second tone spacing is different than the first tone spacing and the second OFDM symbol duration is different than the first OFDM symbol duration, the apparatus comprising:
a first receiver configured to operate according to the first OFDM symbol duration and the first tone spacing;
a processor;
memory in communication with the processor; and instructions stored in the memory and operable, when executed by the processor, to cause the apparatus to:
  perform a cell search or measurement procedure using the first receiver;
  identify one or more discovery reference signal (DRS) in a narrowband region of a carrier based at least in part on the cell search or measurement procedure, wherein the one or more DRS use the first OFDM symbol duration and the first tone spacing;
  identify a second region of the carrier, wherein the second region supports the second OFDM symbol duration and the second tone spacing, wherein the first OFDM symbol duration is greater than the second OFDM symbol duration and the first tone spacing is less than the second tone spacing; and
  communicate in the second region of the carrier using the second OFDM symbol duration and the second tone spacing.

21. The apparatus of claim 20, wherein the instructions are operable to cause the apparatus to:
  communicate in the second region of the carrier using a second receiver that operates according to the second OFDM symbol duration and the second tone spacing.

22. The apparatus of claim 20, wherein the instructions are operable to cause the apparatus to:
  transmit the one or more DRS and a first system information (SI) message during a first time period using the first OFDM symbol duration and the first tone spacing; and
  transmit a second SI message during a second time period using the second OFDM symbol duration and the second tone spacing, wherein the second SI message comprises a difference relative to the first SI message.

23. The apparatus of claim 22, wherein the one or more DRS, the first SI message, and the second SI message are transmitted on a first channel that supports communication with the first set of devices and the second set of devices, and wherein the instructions are operable to cause the processor to:
  transmit one or more additional DRS in a second channel using the first OFDM symbol duration and the first tone spacing, wherein the second channel supports communication with the second set of devices.

24. The apparatus of claim 20, wherein the instructions are operable to cause the apparatus to:
  transmit the one or more DRS and a first system information (SI) message in a first channel of the carrier during a first time period, wherein the first channel supports communication with the first set of devices and the second set of devices; and
  transmit one or more additional DRS and a second SI message in the first channel and a second channel of the carrier during a second time period, wherein the second channel supports communication with the second set of devices.

25. The apparatus of claim 20, wherein the instructions are operable to cause the apparatus to:
  receive a measurement report from a user equipment (UE); and
  determine a number of system bandwidth channels for a neighbor base station, that the neighbor base station supports communication using the second OFDM symbol duration and the second tone spacing or that the second OFDM symbol duration and the second tone spacing are unsupported by the neighbor base station based at least in part on the measurement report.

26. The apparatus of claim 20, wherein the instructions are operable to cause the apparatus to:
  determine whether a channel supports communication using the first OFDM symbol duration and the first tone spacing based at least in part on the one or more DRS, an SI message, a phase shift between different pilots within the one or more DRS, a relative location of a secondary synchronization signal (SSS) with respect to a primary synchronization signal (PSS) within DRS, or a successful decoding attempt of the SI message.

27. A non-transitory computer-readable medium storing code for wireless communication in a system that supports communication with a first set of devices using a first orthogonal frequency division multiplexing (OFDM) symbol duration associated with a first tone spacing and second set of devices using a second OFDM symbol duration associated with a second tone spacing, wherein the second tone spacing is different than the first tone spacing and the second OFDM symbol duration is different than the first OFDM symbol duration, the code comprising instructions executable to:
  perform a cell search or measurement procedure using a first receiver that operates according to the first OFDM symbol duration and the first tone spacing;
  identify one or more discovery reference signal (DRS) in a narrowband region of a carrier based at least in part on the cell search or measurement procedure, wherein the one or more DRS use the first OFDM symbol duration and the first tone spacing;
  identify a second region of the carrier, wherein the second region supports the second OFDM symbol duration and the second tone spacing, wherein the first OFDM symbol duration is greater than the second OFDM symbol duration and the first tone spacing is less than the second tone spacing; and
  communicate in the second region of the carrier using the second OFDM symbol duration and the second tone spacing.

* * * * *